(12) United States Patent
Kurzman et al.

(10) Patent No.: US 9,064,241 B2
(45) Date of Patent: Jun. 23, 2015

(54) SYSTEMS, METHODS, AND MEDIA FOR PROVIDING VIRTUAL MOCK TRIALS

(75) Inventors: Ronny L. Kurzman, Brooklyn, NY (US); David L. Kurzman, Coral Springs, FL (US)

(73) Assignee: Magna Legal Services, LLC, Philadelphia, PA (US)

( * ) Notice: Subject to any disclaimer, the term of this patent is extended or adjusted under 35 U.S.C. 154(b) by 0 days.

(21) Appl. No.: 13/526,189

(22) Filed: Jun. 18, 2012

(65) Prior Publication Data

US 2012/0322044 A1     Dec. 20, 2012

Related U.S. Application Data

(60) Provisional application No. 61/498,246, filed on Jun. 17, 2011.

(51) Int. Cl.
| | |
|---|---|
| *G09B 25/00* | (2006.01) |
| *G06Q 10/10* | (2012.01) |
| *G06Q 50/18* | (2012.01) |
| *G09B 5/08* | (2006.01) |
| *G09B 19/00* | (2006.01) |

(52) U.S. Cl.
CPC ............. *G06Q 10/103* (2013.01); *G06Q 50/18* (2013.01); *G09B 5/08* (2013.01); *G09B 19/00* (2013.01)

(58) Field of Classification Search
CPC ....................................... G09B 25/00
USPC ................................................. 434/365, 235
See application file for complete search history.

(56) References Cited

U.S. PATENT DOCUMENTS

| | | | | | |
|---|---|---|---|---|---|
| 6,157,913 | A | * | 12/2000 | Bernstein ...................... | 704/275 |
| 7,124,164 | B1 | * | 10/2006 | Chemtob ...................... | 709/204 |
| 2001/0053967 | A1 | * | 12/2001 | Gordon et al. ................. | 703/22 |
| 2006/0022796 | A1 | * | 2/2006 | Striemer ....................... | 340/7.2 |
| 2007/0048703 | A1 | * | 3/2007 | Rosen .......................... | 434/235 |

* cited by examiner

*Primary Examiner* — Xuan Thai
*Assistant Examiner* — Robert P Bullington
(74) *Attorney, Agent, or Firm* — Byrne Poh LLP

(57) ABSTRACT

Systems, methods, and media for providing virtual mock trials are provided. A system includes one or more hardware processors that are operative to initiate an interactive mock trial session via a network to a plurality of remote participants. The one or more hardware processors generate first and second presentation displays of the mock trial, each having an arrangement of content that may include a live-action video, a pre-recorded video, an image, interactive actuators or icons, text, or combinations thereof. The first display has a first set of interactive options and is transmitted to a plurality of mock jurors, while the second display has a second set of interactive options and is transmitted to at least one other remote participant, which may be, for example, a trial manager, an attorney, or an observer. Evaluations of the mock trial are interactively completed and received by the hardware processor.

17 Claims, 43 Drawing Sheets

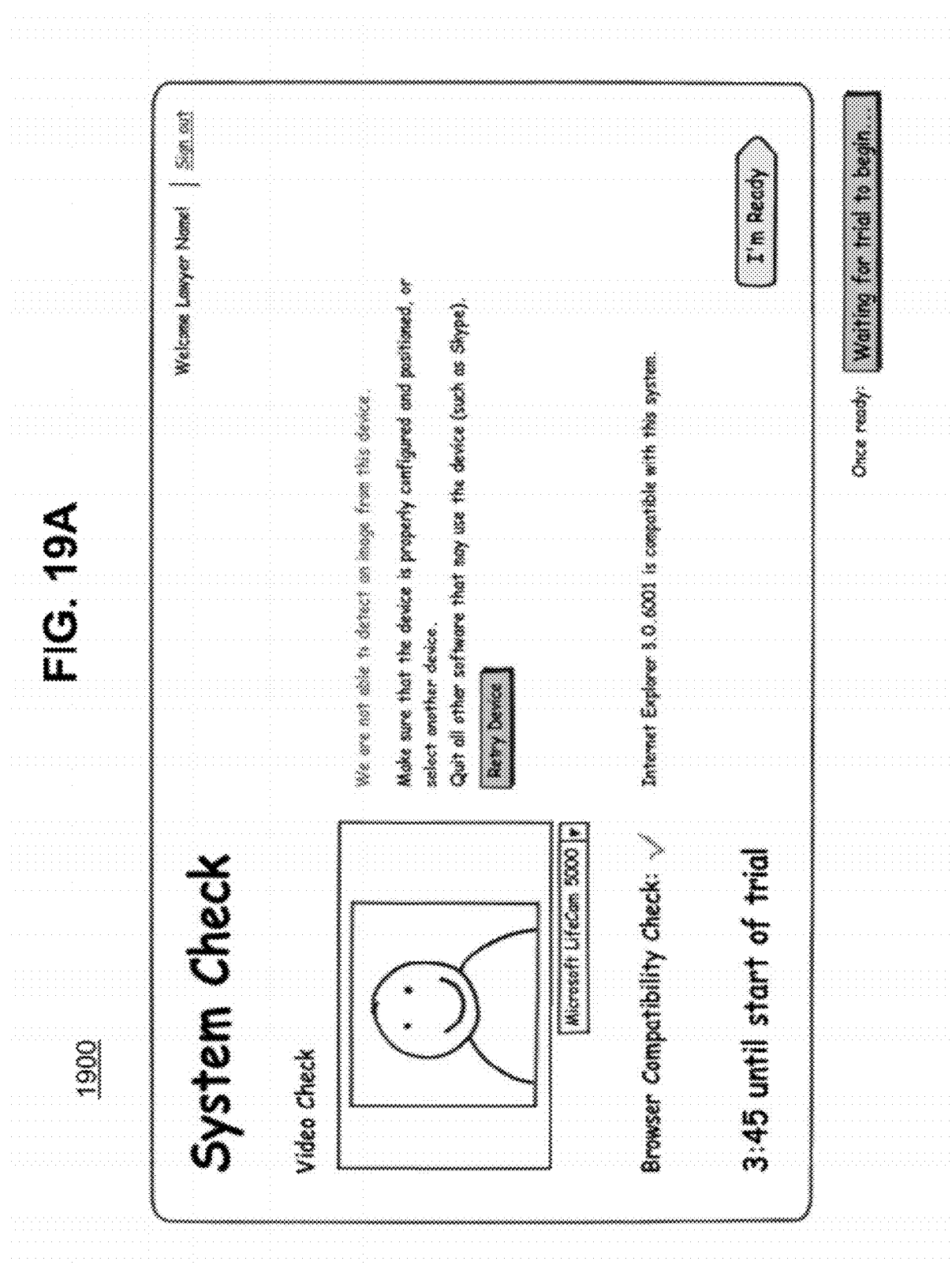

SYSTEMS, METHODS, AND MEDIA FOR PROVIDING VIRTUAL MOCK TRIALS

CROSS REFERENCE TO RELATED APPLICATION

This claims the benefit of U.S. Provisional Patent Application No. 61/498,246, filed Jun. 17, 2011, which is hereby incorporated by reference herein in its entirety.

TECHNICAL FIELD

The disclosed subject matter relates to systems, methods, and media for providing virtual mock trials and/or various types of virtual focus groups.

BACKGROUND

A mock trial is a simulated trial that may be used by a plaintiff or a defendant to test various aspects of a case in front of a group of participants acting as jurors. For example, mock trials may be used to test the effectiveness and/or persuasiveness of particular attorneys, witnesses, evidence, demonstratives, and/or various theories, strategies, arguments, and/or defenses. Mock trials are typically conducted in a suitable physical location (e.g., something resembling a courtroom) and require the physical presence at that location of the participants including those acting as jurors and at least one attorney and/or others who are to present their case to the mock jury for their reaction and/or evaluation.

SUMMARY

Systems, methods, and media providing virtual mock trials and/or various types of virtual focus groups are provided.

In accordance with some embodiments, methods of providing a presentation to a plurality of remote participants for evaluation of the presentation by at least some of the remote participants are provided, the methods comprising: (1) receiving at a hardware processor information pertaining to a presentation for evaluation; (2) receiving at the hardware processor information pertaining to a plurality of evaluation participants; (3) receiving at the hardware processor a request to initiate an interactive presentation session; (4) generating a first and a second display of the presentation, the first and second displays of the presentation each comprising an arrangement of content, the content comprising at least one of a live-action video, a pre-recorded video, an image, text, interactive actuators or icons, or combinations thereof, wherein the first display has a first set of interactive options and the second display has a second set of interactive options; (5) transmitting via a network the first display of the presentation to a plurality of user devices associated with the plurality of evaluation participants and the second display of the presentation to a user device of at least one other remote participant; and (6) receiving at the hardware processor at least one evaluation of the presentation.

In accordance with some embodiments, systems for providing a presentation to a plurality of remote participants for evaluation of the presentation by at least some of the remote participants are provided, the systems comprising one or more hardware processors operative to (1) receive information pertaining to a presentation for evaluation; (2) receive information pertaining to a plurality of evaluation participants; (3) receive a request to initiate an interactive presentation session; (4) generate a first and a second display of the presentation, the first and second displays of the presentation each comprising an arrangement of content, the content comprising at least one of a live-action video, a pre-recorded video, an image, text, interactive actuators or icons, or combinations thereof, wherein the first display has a first set of interactive options and the second display has a second set of interactive options; (5) transmit via a network the first display of the presentation to a plurality of user devices associated with the plurality of evaluation participants and the second display of the presentation to a user device of at least one other remote participant; and (6) receive at least one evaluation of the presentation.

In accordance with some embodiments, non-transitory computer readable media containing computer-executable instructions that, when executed by a processor, cause the processor to perform a method of providing a presentation to a plurality of remote participants for evaluation of the presentation by at least some of the remote participants are provided, the method comprising: (1) receiving information pertaining to a presentation for evaluation; (2) receiving information pertaining to a plurality of evaluation participants; (3) receiving a request to initiate an interactive presentation session; (4) generating a first and a second display of the presentation, the first and second displays of the presentation each comprising an arrangement of content, the content comprising at least one of a live-action video, a pre-recorded video, an image, text, interactive actuators or icons, or combinations thereof, wherein the first display has a first set of interactive options and the second display has a second set of interactive options; (5) transmitting via a network the first display of the presentation to a plurality of user devices associated with the plurality of evaluation participants and the second display of the presentation to a user device of at least one other remote participant; and (6) receiving at least one evaluation of the presentation.

DETAILED DESCRIPTION

Systems, methods, and media for providing virtual mock trials and/or various types of virtual focus groups are provided.

In accordance with some embodiments, virtual mock trials can be conducted with a variety of user types participating via computers or other suitable user devices coupled to each other via one or more networks, such as, for example, the Internet. Any suitable combination or configuration of wired and/or wireless communication networks, such as, for example, a LAN (local area network), WAN (wide area network), VPN (virtual private network), telephone network, and/or cable network may be used alternatively or additionally to the Internet. User types in some embodiments can include evaluation participants, presentation manager participants, observer participants, and/or any other suitable users or remote participants. In the context of a mock trial, user types in some embodiments can include trial managers, jurors, juror forepersons, recruiters, lawyers (e.g., plaintiff attorney and defense attorney), observers, and/or any other suitable users.

In some embodiments, users can use ordinary Web browsers on personal computers (or any other suitable user devices) to connect to one or more servers hosting a mock trial application as described herein. Alternatively, any other suitable presentation application can be used. Users can interact in some embodiments using audio and/or video conferencing via any suitable communications medium, such as the Internet, telephone line, etc.

Figure 1:
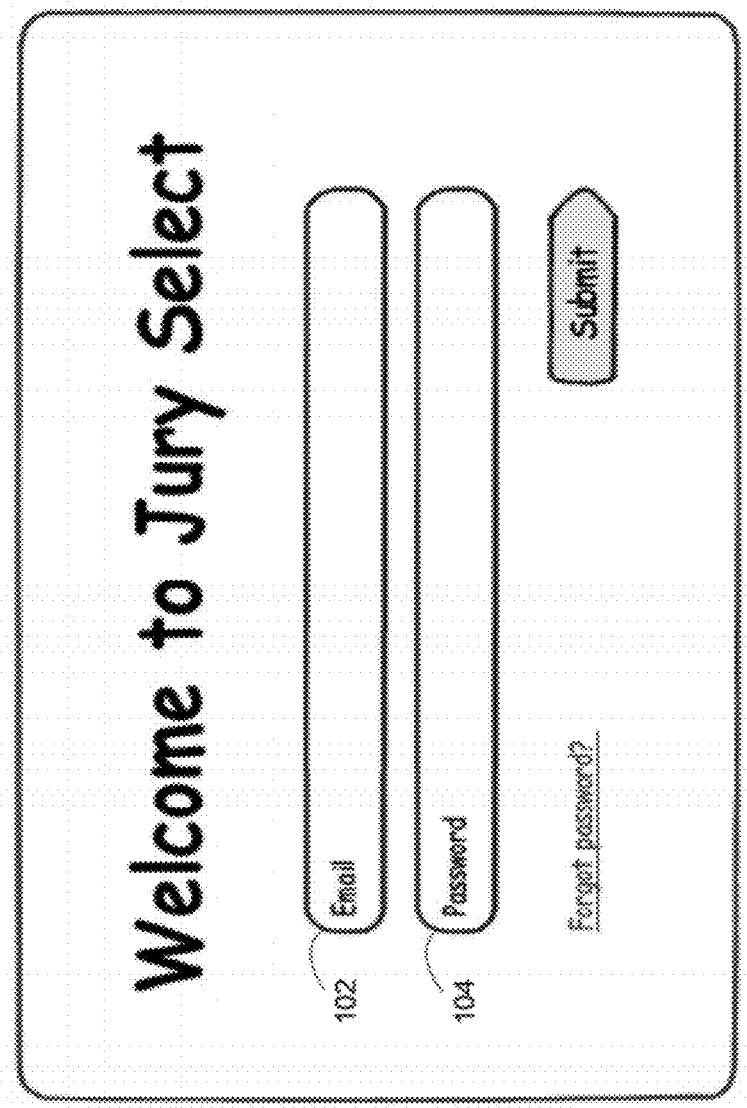
FIG. 1 shows an illustrative display screen that can be used to login in accordance with some embodiments.

In some embodiments, a user can first be required to login as illustrated in FIG. 1. As shown in example illustrative login screen 100, users can be prompted to enter an email address at email field 102 (or any other suitable identifier) and/or a password at password field 104.

Next, the user, who may be a trial manager, can set up a mock trial using the example illustrative display screens of FIGS. 2-11.

Figure 2:
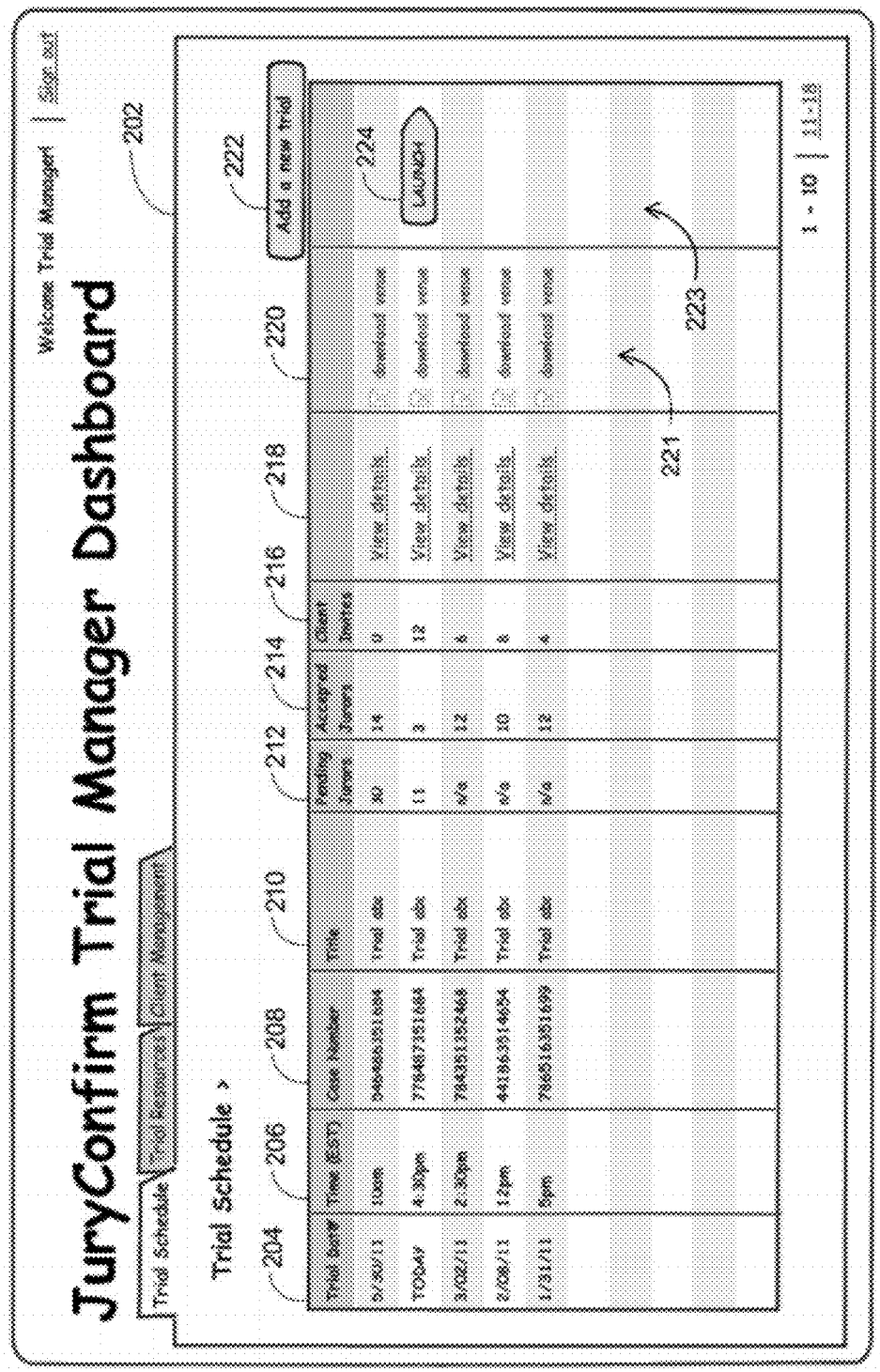
FIGS. 2-11 show illustrative display screens that can be used by a trial manager to set up a mock trial in accordance with some embodiments.

Turning to FIG. 2, a trial manager can use in some embodiments a "Trial Schedule" interface 202 of a display screen 200 to view for each trial, the trial's date 204, time 206, case number 208, title 210, number of pending jurors 212, number of accepted jurors 214, number of client invites 216, details 218, and venue information 220. From this interface, a trial manager can also add a new trial by actuating icon 222 or can launch a trial by actuating icon 224. In some embodiments, the download venue actuator 220 may be replaced with a registered juror icon or actuator in each row of column 221 that when actuated causes a window to open that shows a list of registered jurors for the trial of that row. In some embodiments, column 223 may be used to indicate the status of each trial, such as, for example, "Scheduled," "Cancelled," and/or Completed" (wherein the launch icon 224 may be located elsewhere on interface 202 or deleted from interface 202).

Figure 3:
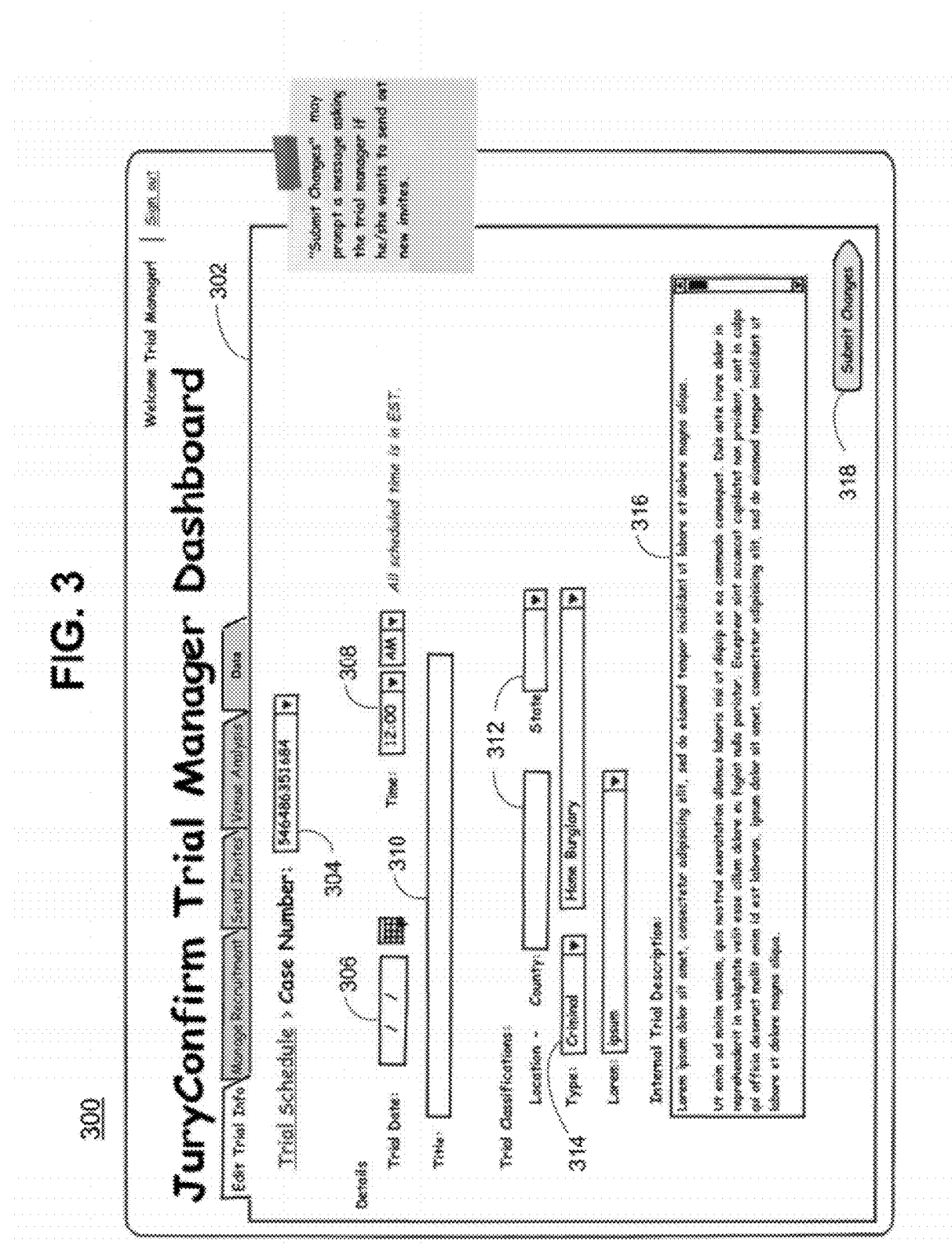

As shown in FIG. 3, a trial manager can use in some embodiments an "Edit Trial Info" interface 302 of a display screen 300 to view and edit the details of a particular trial by selecting a case number from a drop-down menu 304. The trial manager can edit the trial's date 306, time 308, title 310, location 312, type 314 (e.g., criminal, personal injury, contract, etc.), internal description 316, and/or any other suitable information. Upon submitting the changes by actuating icon 318, the user can be prompted in some embodiments as to whether new invitations reflecting the changes should be sent to the trial's participants. In some embodiments, trial start time drop-down menu 304 may alternatively be replaced with a data field requiring a user to enter a start time. Additionally, in some embodiments, interface 302 may include an additional data field or drop-down menu for adding a trial "end time." Interface 302 may additionally include a data field or drop-down menu in the Trial Classification section for selecting a city and/or judicial district. Furthermore, in some embodiments, interface 302 may include actuators or icons for adding a new state, city, county, judicial district, and/or trial type.

Figure 4A:
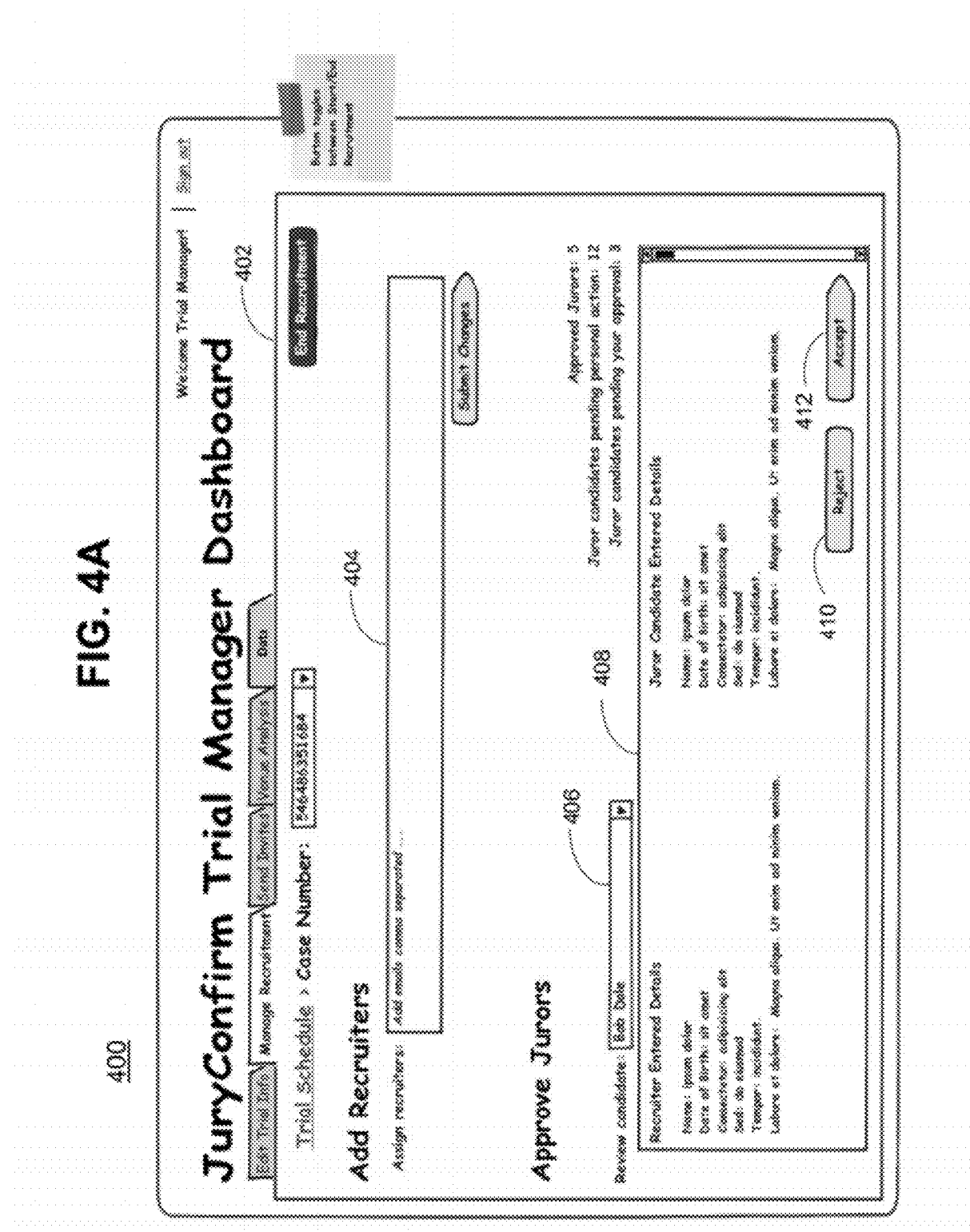

FIG. 4A is an illustrative example of a "Manage Recruitment" interface 402 of a display screen 400 for adding recruiters via data entry field 404 and for approving jurors in accordance with some embodiments. A recruiter may be a person employed to find potential mock trial jurors. Such jurors may be found by a recruiter posting an advertisement, soliciting people at shopping malls, random digit dialing, transmitting an electronic request to email addresses on a distribution list, other industry standard methods, etc.

When reviewing candidate jurors, a trial manager can select a name of a candidate juror from a drop-down menu 406, review details about that candidate as shown in information window 408, and select whether to reject or accept the candidate by actuating either icon 410 or 412, respectively. Mock trials can have any suitable number of jurors, such as, for example, 12 to 40 jurors. Once an entire jury is recruited, the trial manager can make final approvals, at which point an automated email containing demographic information can be emailed to email accounts previously provided by clients/observers/attorneys.

Figure 4B:
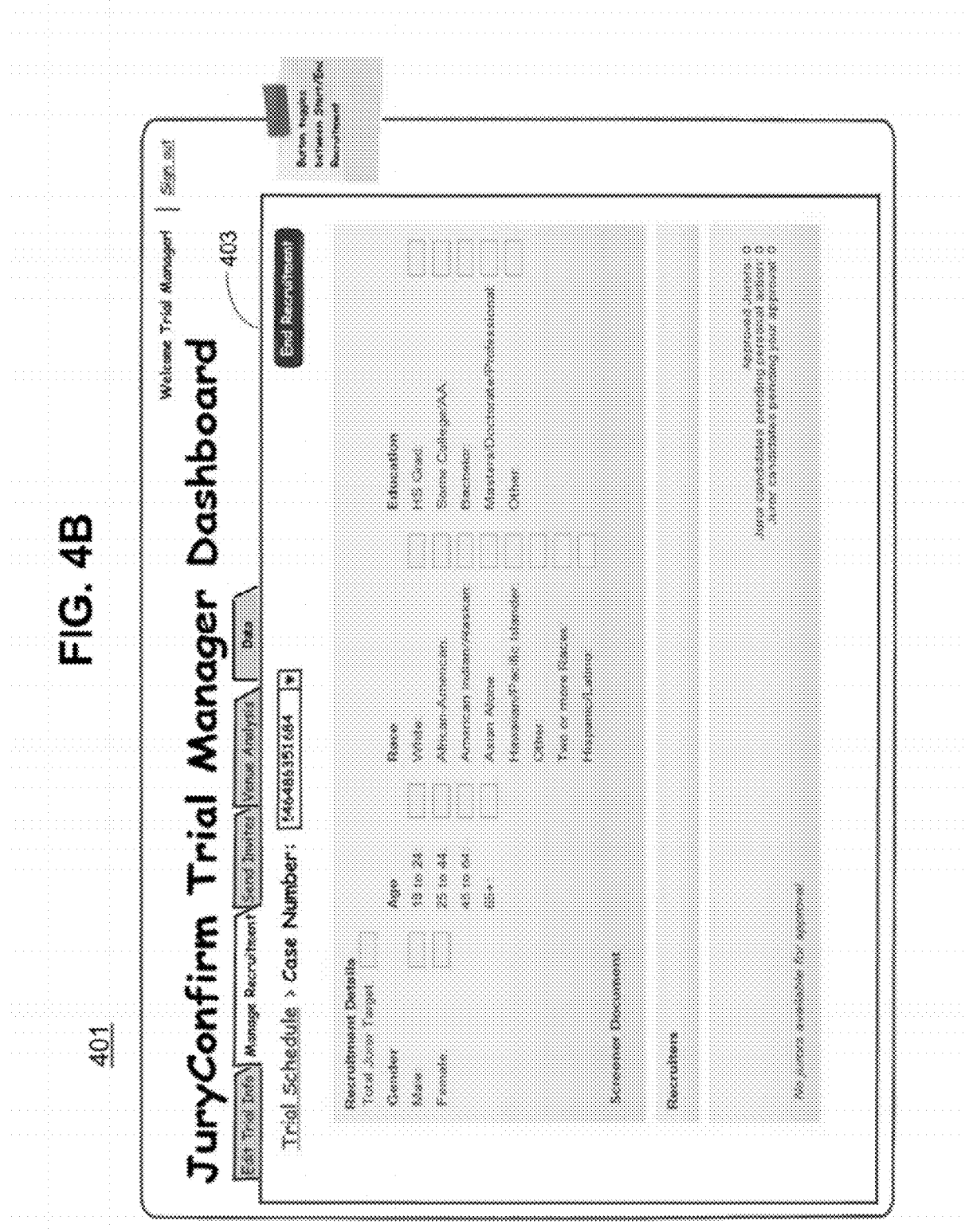

FIG. 4B is an illustrative example of a "Manage Recruitment" interface 403 of a display screen 401 for providing information about potential jurors such as, for example, total juror target, gender, age range, race, and/or education.

Figure 5:
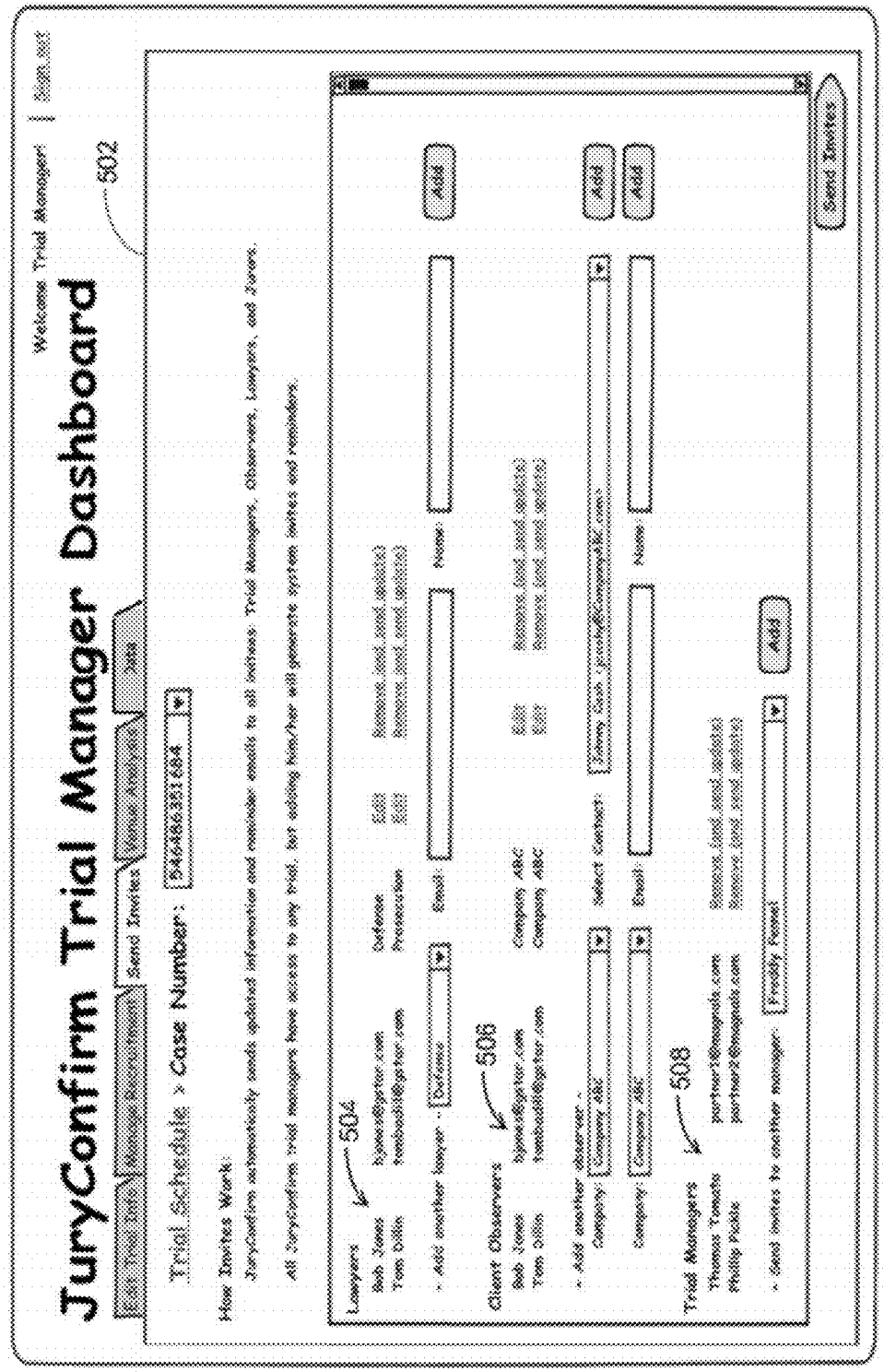

Next, as shown in FIG. 5, a trial manager can use in some embodiments a "Send Invites" interface 502 of a display screen 500 to send out invitations with user specific log-in information for different user types. For example, a trial manager can send out invitations to defense and plaintiff lawyers 504 with corresponding email addresses and names. In another example, a trial manager can send out invitations to client observers 506, specifying a company name, a contact, an email address, a name, etc. In some embodiments, the following three types of invitations to a mock trial can be supported: invitations to jurors, invitations to trial managers 508, and invitations to individuals from a sponsoring customer firm, attorneys, and/or observers. In yet another example, a trial manager can send invitations to other trial managers. In some embodiments, auto suggestion can be used to speed the entering of a name of a user, firm, or customer for whom the mock trial will take place.

Automated emails can be sent with a welcome message to email addresses of participants (of any kind) whose data has been entered. These emails can include a link back to a test page (described further below) wherein the participant's connectivity, camera, and operating system can be tested to determine whether they are within given performance requirements. An automated email with a schedule, listing of materials, general participation information, and any other suitable information can additionally or alternatively be sent. A demonstration of how the system works can further be provided in some embodiments to familiarize participants with the system. Permissions can be set by the trial manager to restrict access to specified areas and functionality based on user types. If a trial manager adds an email address to a list that has already been sent email invites, another email invite can be generated and sent to the user of the added email address.

Figure 6A:
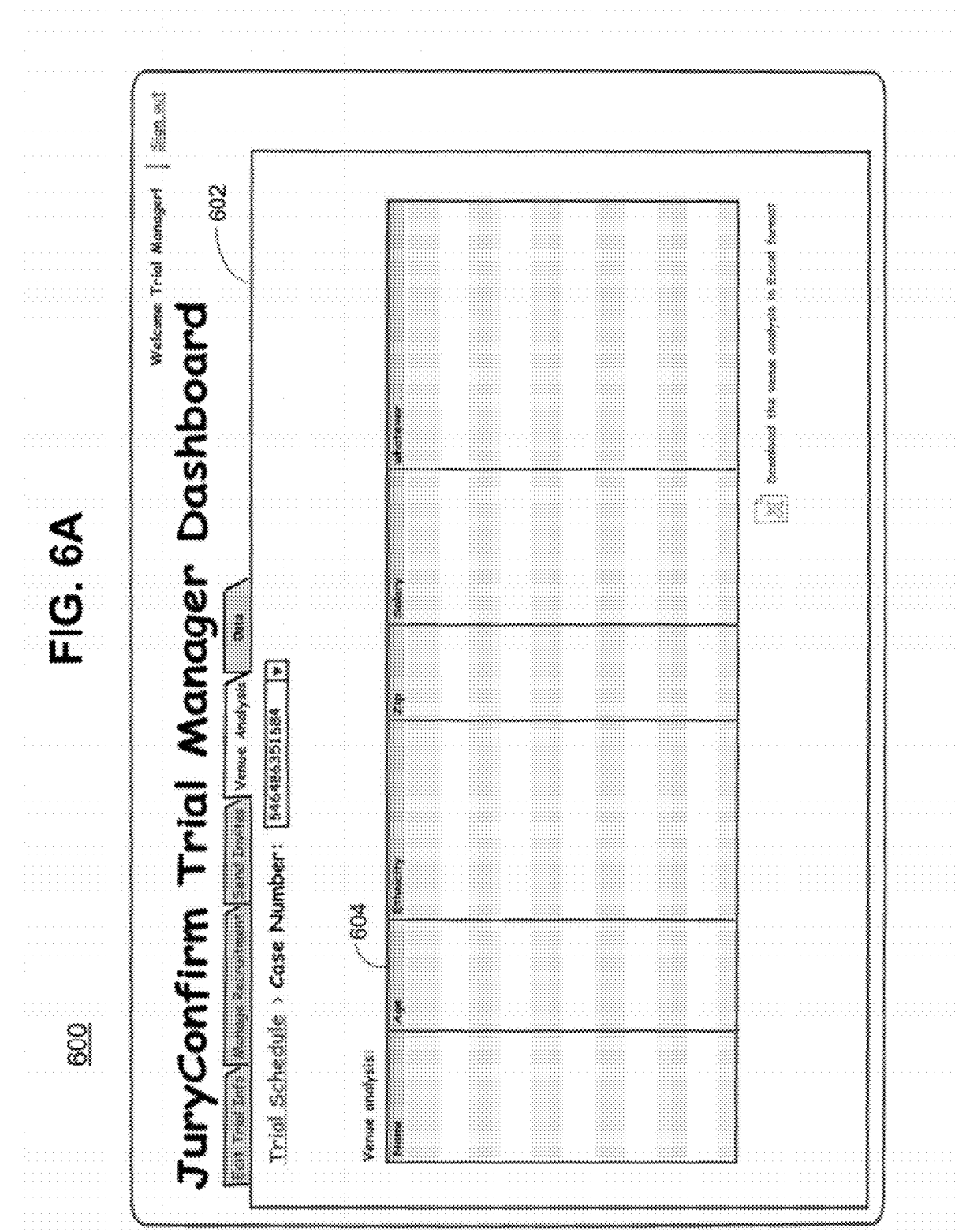

As illustrated in FIG. 6A, a "Venue Analysis" interface 602 of a display screen 600 can be provided for performing venue analysis. As shown, name and demographic information (for example) for a venue can be shown in information window 604. Such information can include, for example, the name of the venue, average age, majority ethnicity, zip (or postal) code, average salary, etc.

Figure 6B:
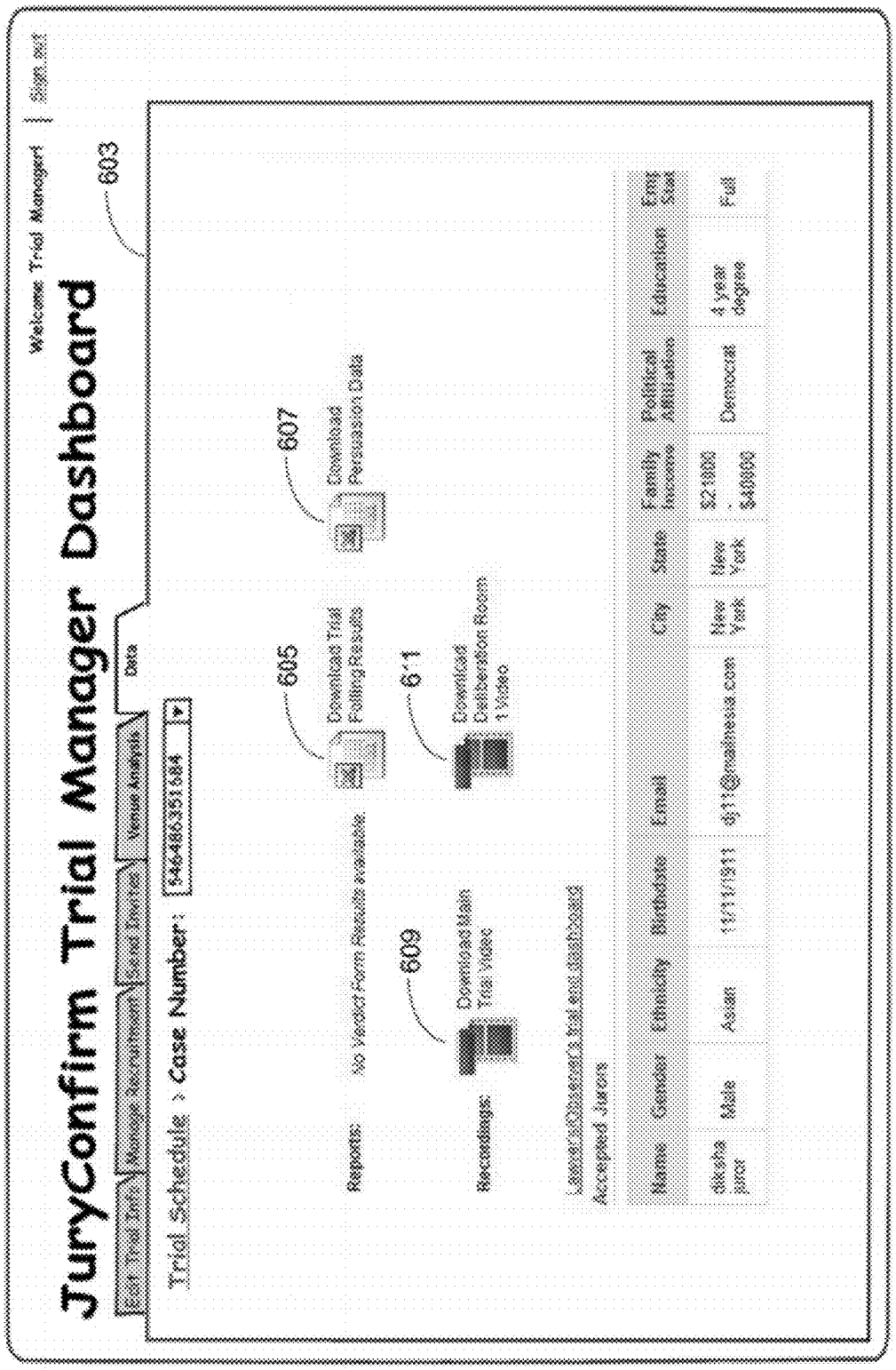

As illustrated in FIG. 6B, a "Data" interface 603 of a display screen 601 can be provided for downloading, for example, trial polling results (by actuating icon 605) and/or persuasion data (by actuating icon 607). Alternatively or additionally, icons for downloading other types of reports can be provided. In some embodiments, mock trials and/or other associated activities (e.g., breakout sessions, deliberation sessions, etc.) can be recorded (audio and/or video). Interface 603 can be used to download such recordings by actuating, for example, main trial video icon 609 and/or deliberation room #1 video icon 611. Alternatively or additionally, icons for downloading other types of recordings can be provided.

Figure 7:
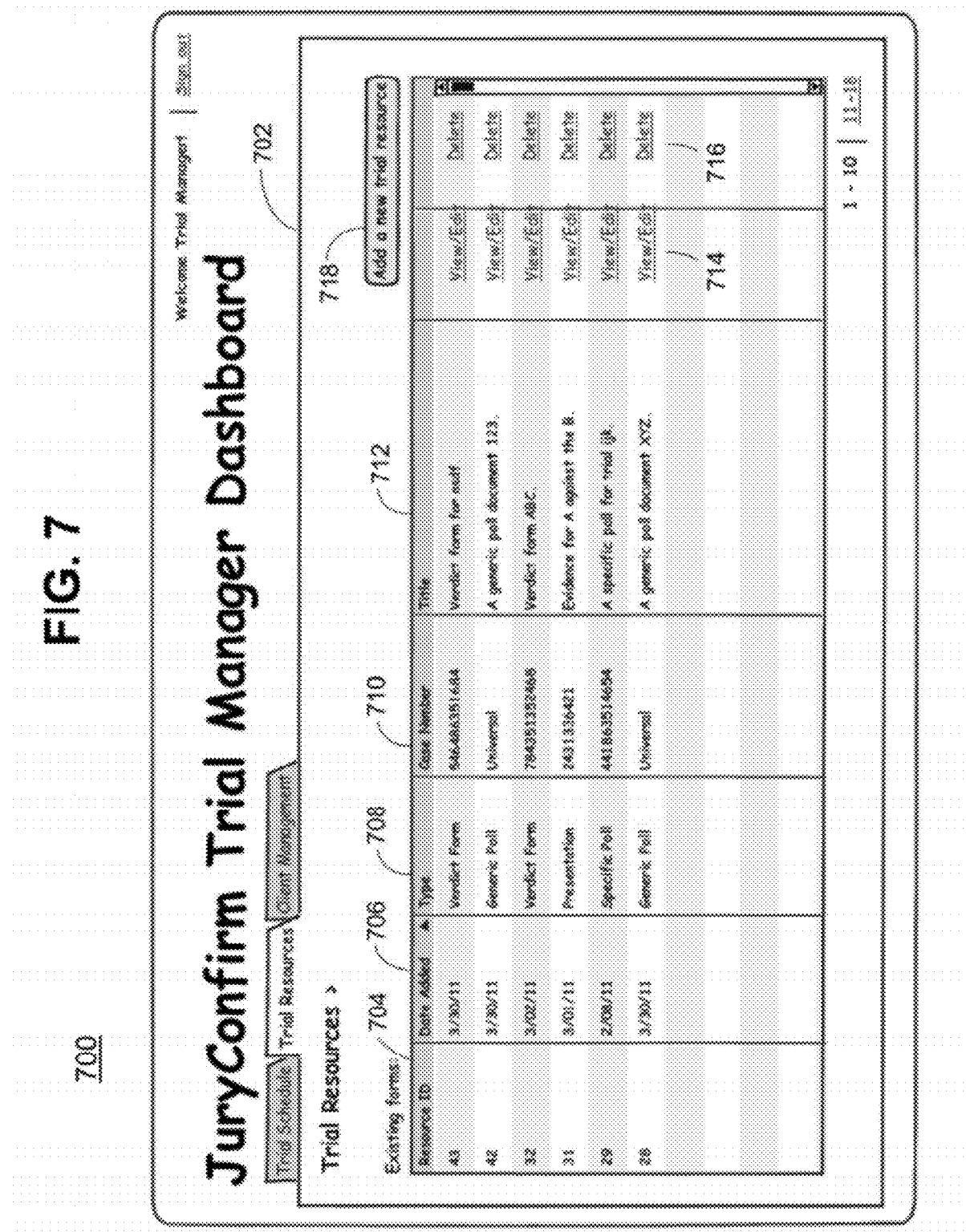
Figure 8:
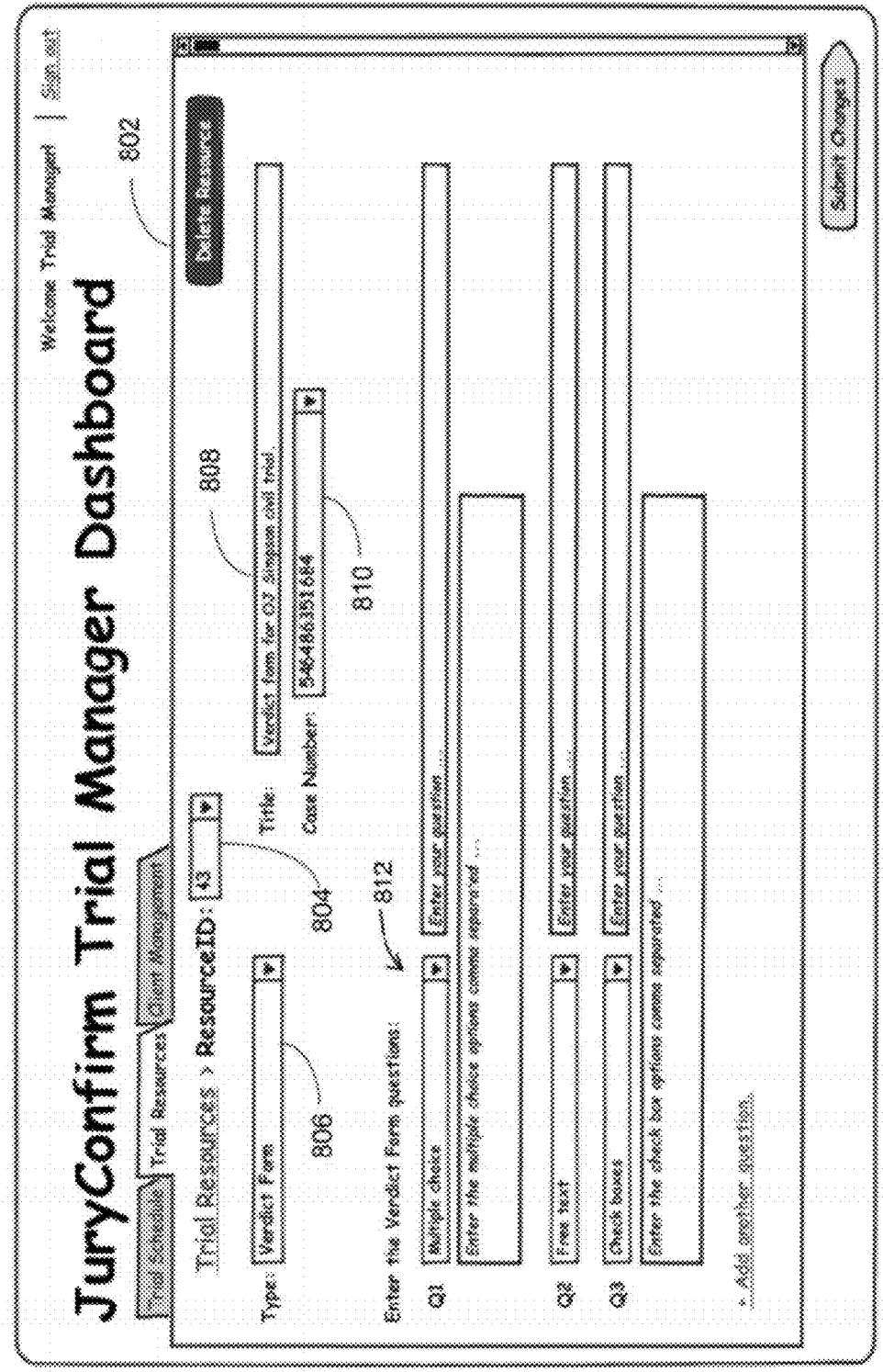
Figure 9:
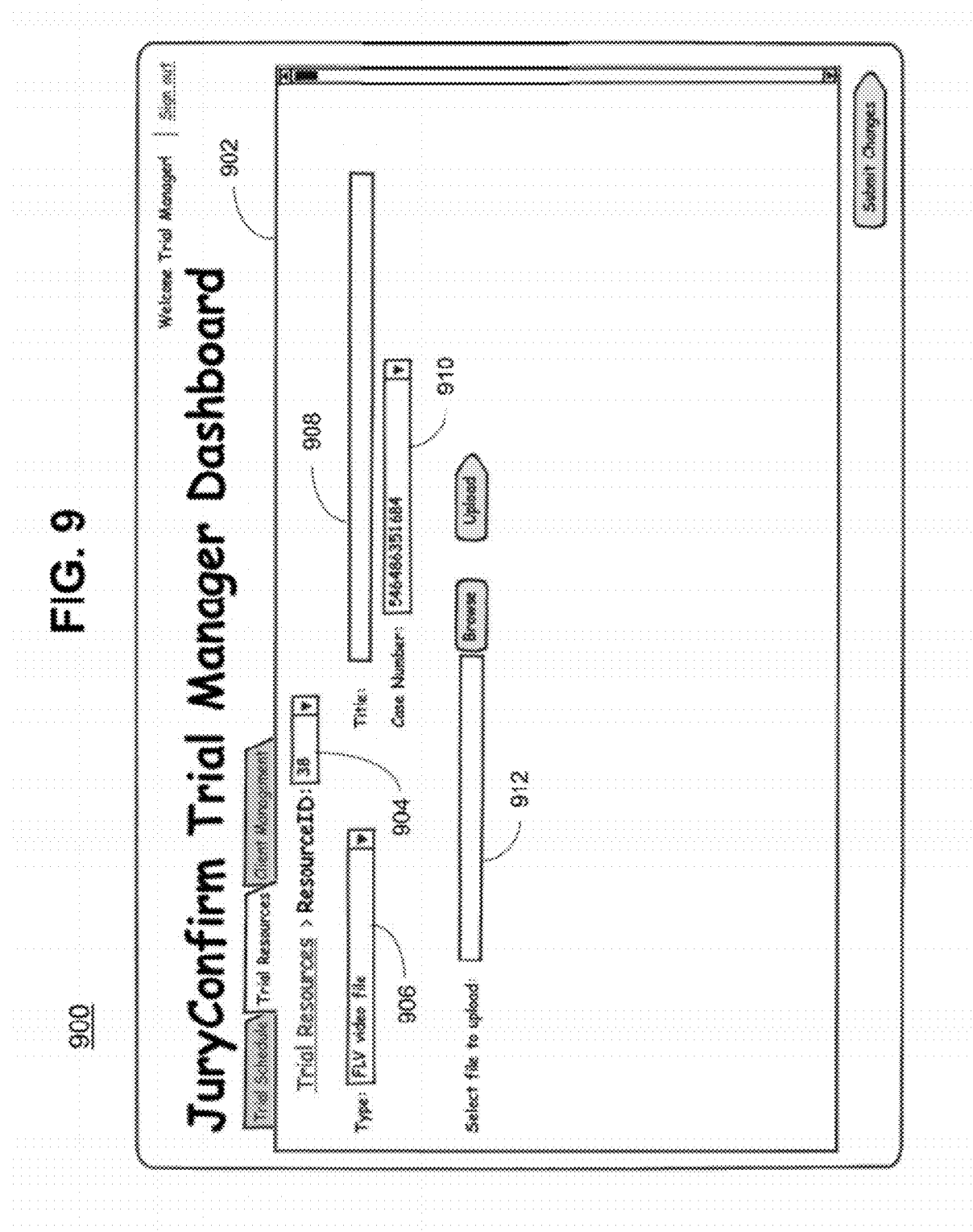

Using an interface such as illustrative "Trial Resources" interface 702 of a display screen 700, as shown in FIG. 7, a trial manager can additionally control trial resources that can be used at a mock trial in accordance with some embodiments. For example, for each resource, a trial manager can view a resource identifier 704, a date added 706, a type 708, a case number 710, a title 712, etc. The trial manager can also select a view/edit actuator 714 to view or edit information regarding a listed resource. The trial manager can further select a delete actuator 716 to delete a resource from the list, and/or select icon 718 to add a resource to the list. For example, when a trial manager selects a view/edit actuator 714 for a resource, the corresponding information can be displayed and edited via an interface such as interface 802 of a display screen 800, as illustrated in FIG. 8. As shown, the manager can select, for example, ResourceID 43 from a drop-down menu 804 and edit/create/select a type of resource from a drop-down menu 806 (e.g., a verdict form), a title 808, an applicable case number from drop-down menu 810, and various types of questions and question types 812 (e.g., those having multiple choice answers, check boxes, etc.) related to that resource. In some embodiments, the trial manager can also view, edit, and add multimedia resources such as a video and/or images of different file formats. An example of a user interface for performing this is an interface 902 of a display screen 900, as illustrated in FIG. 9. Using interface 902, the manager can specify a Resource ID 904, a type 906, a title 908, a case number 910, a file to be uploaded 912, etc.

Figure 10:
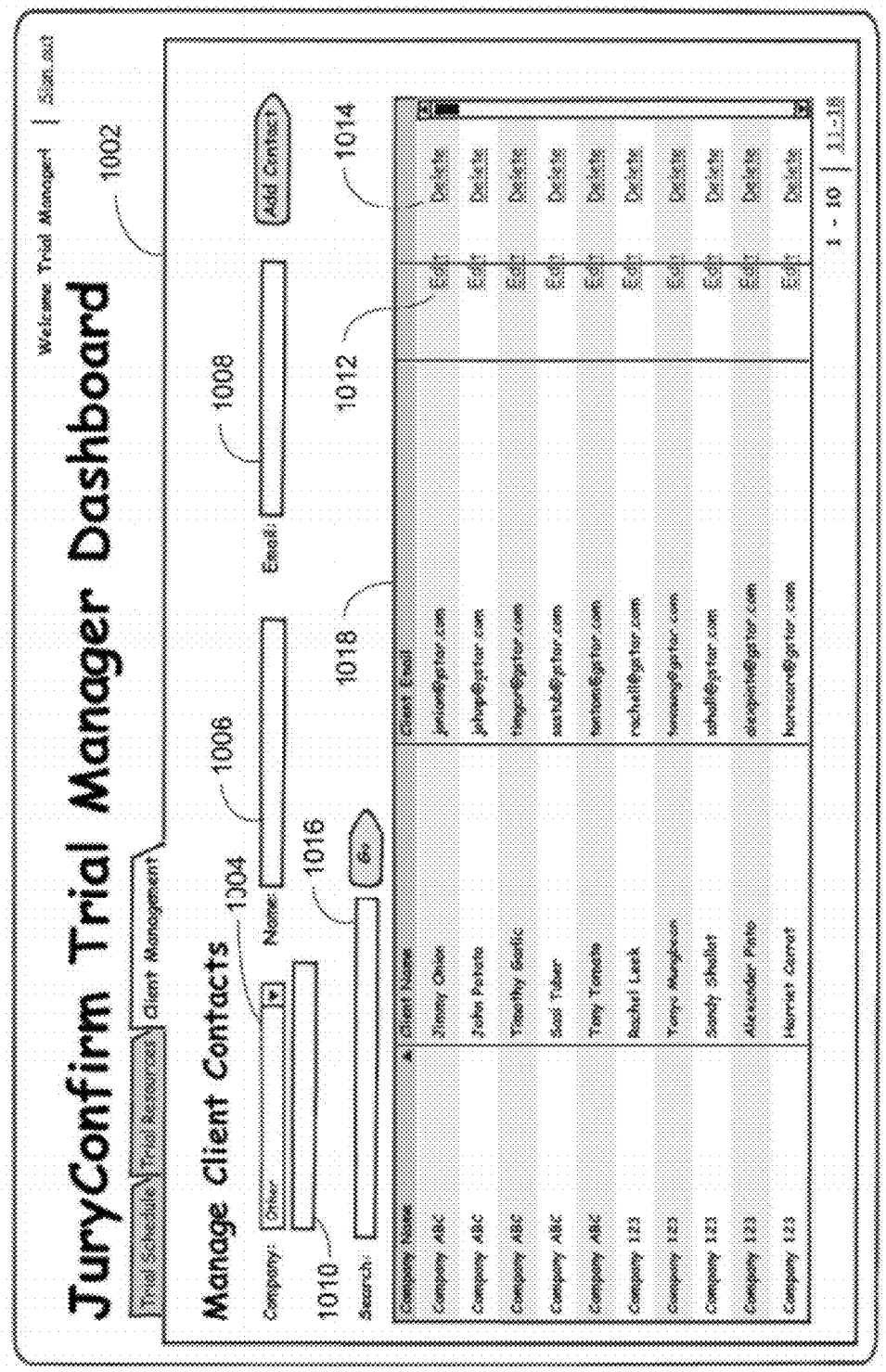

As illustrated in FIG. 10, a trial manager can use an interface such as a "Client Management" interface 1002 of display screen 1000 to manage client contacts in some embodiments. For example, when adding a contact, a trial manager can select or enter a company name using drop-down menu 1004, a personal name using data field 1006, an email address using data field 1008, and/or any other suitable information using, for example, data field 1010. The trial manager can also edit and/or delete contact information using edit actuator 1012 and delete actuator 1014. To find a contact in a long list, a search function 1016 may also be provided. In some embodiments, permission levels for contacts can also be set. Furthermore, in some embodiments, interface 1002 may include a data field for entering a telephone number, an additional column in list 1018 listing telephone numbers on each row, and/or an additional column in list 1018 displaying an actuator on each row for resetting a password.

Figure 11:
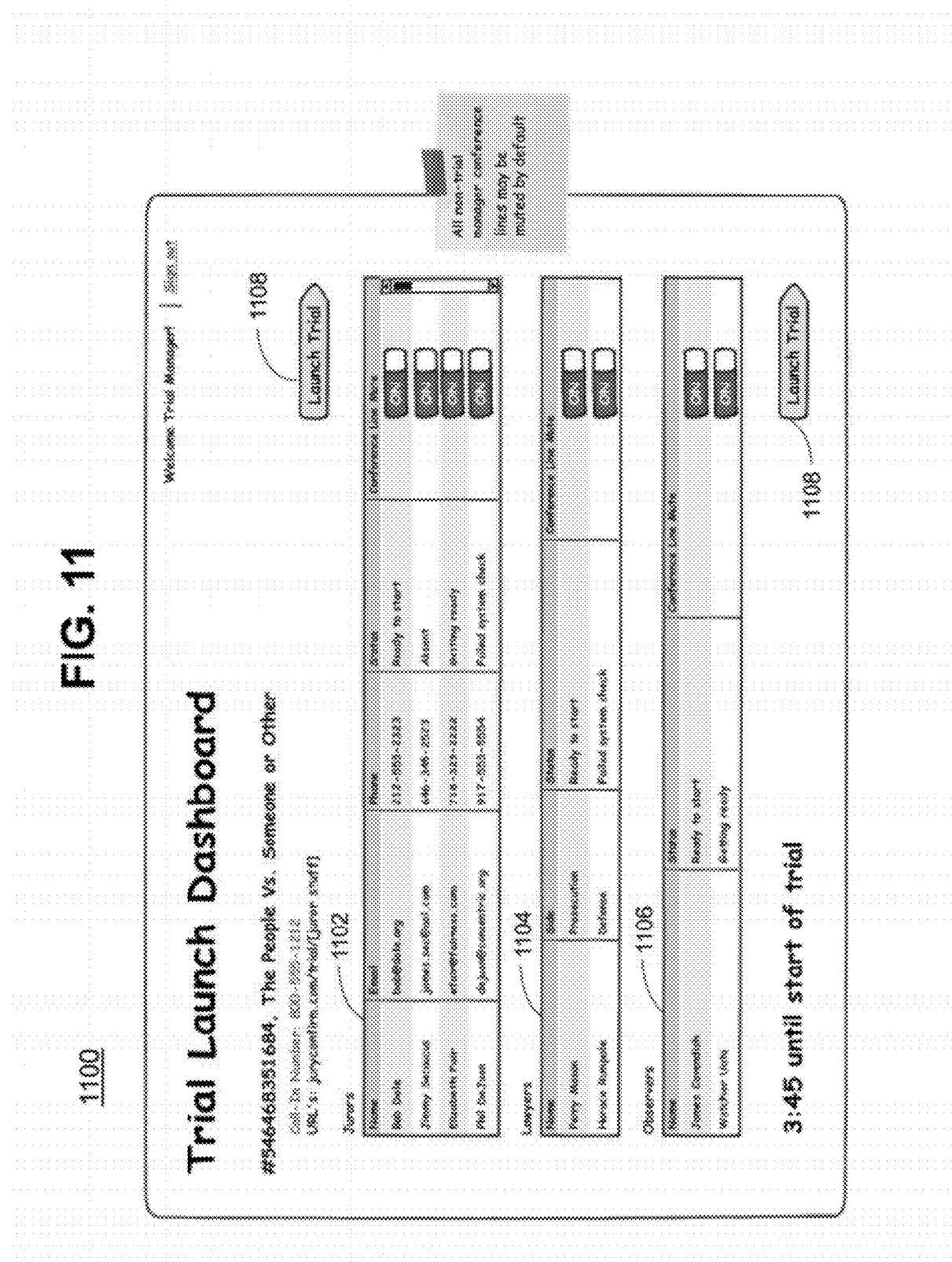

FIG. 11 illustrates an example of a trial launch interface display 1100 for launching a mock trial in accordance with some embodiments. As shown, the trial manager can view information for jurors in window 1102, for lawyers in window 1104, and for observers in window 1106. For example, for jurors, the manager can view the name, email address, phone number, status, and conference line mute state for each juror in window 1102. Additionally or alternatively, in some embodiments, the trial manager can see a juror's polling responses to, for example, general background and opinion questions. Similarly, for each lawyer, the manager can view the name, plaintiff/defendant side, status, and conference line mute state in window 1104, and for each observer, the manager can view the name, status, and conference line mute state in window 1106. Any other suitable information can additionally or alternatively be displayed. When the trial manager is ready, the trial can be launched by pressing a corresponding icon 1108.

Figure 12:
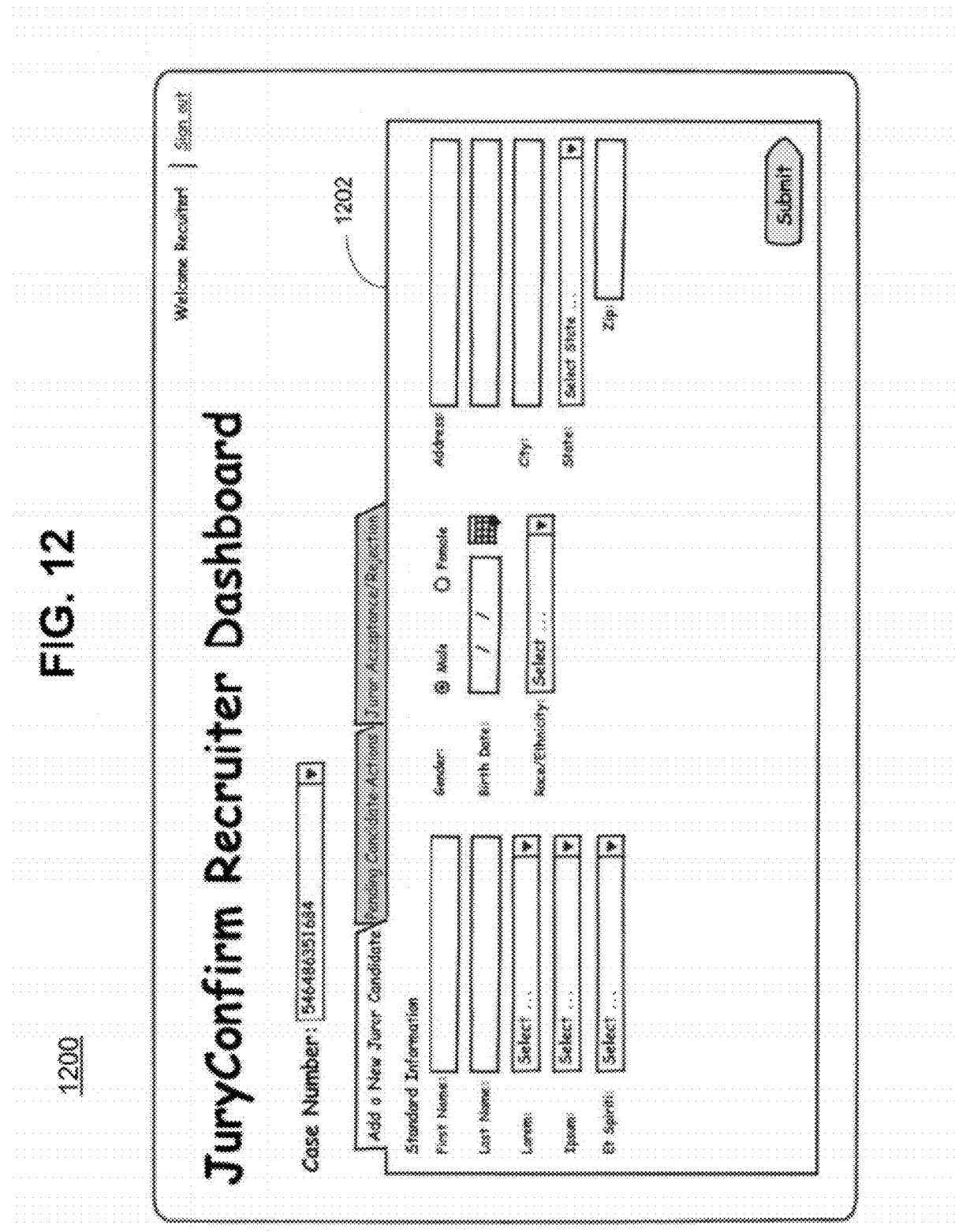
FIGS. 12-14 show illustrative display screens that can be used by a recruiter to set up juror participation in a mock trial in accordance with some embodiments.
Figure 13:
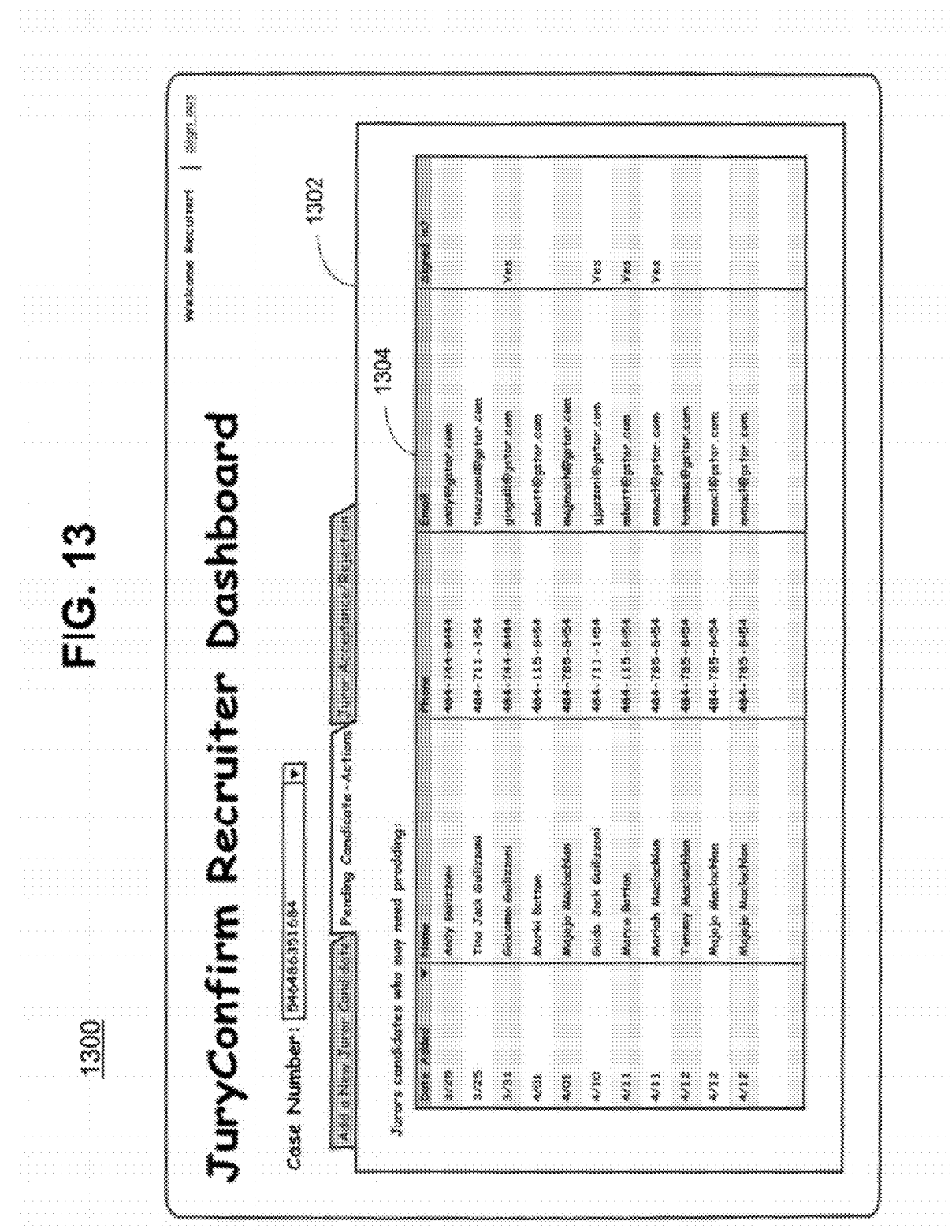
Figure 14:
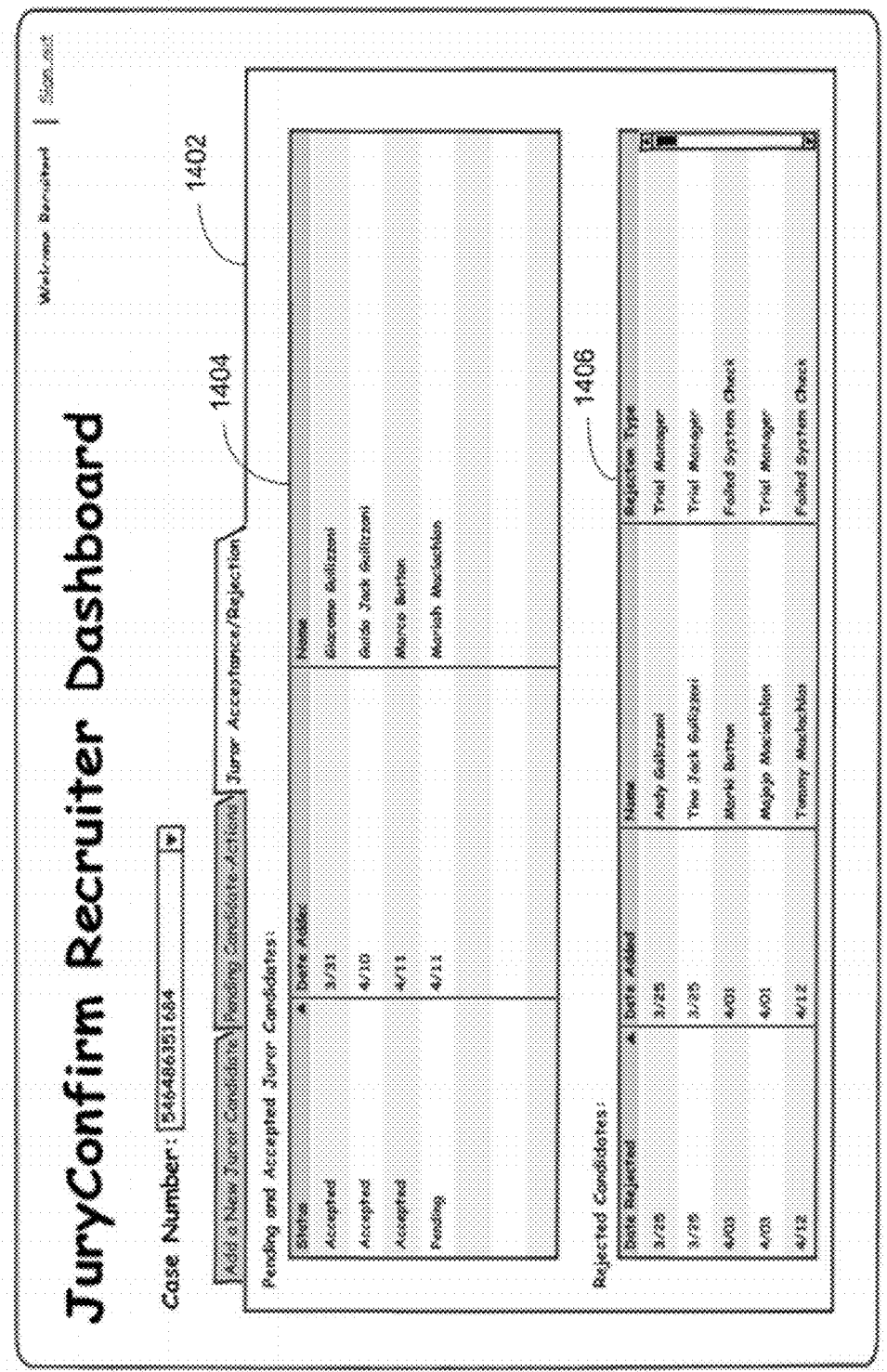

A recruiter user can set up juror participation in a mock trial as illustrated in the example display screens of FIGS. 12-14.

As shown in FIG. 12, a recruiter can use, for example, an "Add a New Juror Candidate" interface 1202 of a display screen 1200 to enter jurors' names and information. In some embodiments, interface 1202 can include data fields or drop-down menus for entering an email address, home and mobile telephone numbers, a fax number, family income, political affiliation, education, employment status, and/or marital status. When the recruiter enters a new juror's information, an email can be automatically generated and sent to that juror with further registration instructions. An email can also be automatically generated and sent to the trial manager describing the current status of a mock jury being formed.

In some embodiments, a recruiter can use, for example, a "Pending Candidate—Actions" interface 1302 of a display screen 1300 and/or a "Juror Acceptance/Rejection" interface 1402 of a display screen 1400, as shown in FIGS. 13 and 14, respectively, to view juror candidates' recent status and information in, for example, window 1304 of FIG. 13 and windows 1404 and 1406 of FIG. 14, and accordingly follow up with jurors who have not completed required actions.

A mock juror can set up his or her participation in a mock trial as illustrated in the example display screens of FIGS. 15-18.

Figure 15:
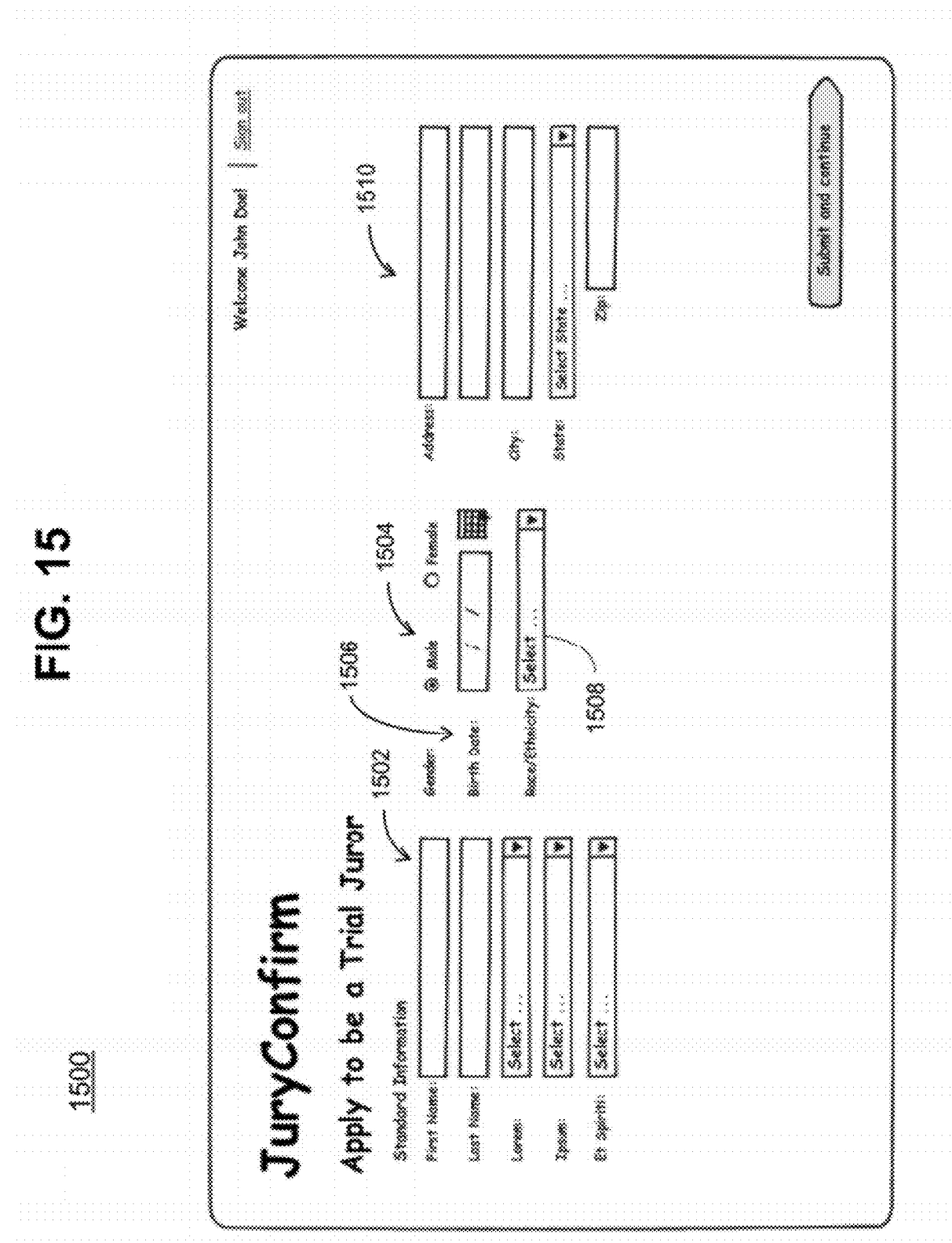
FIG. 15-18 show illustrative display screens that can be used by a mock juror to set up the juror's own participation in a mock trial in accordance with some embodiments.

FIG. 15 illustrates an example of a user interface display 1500 for an enrollment form that requests personal information for a person wanting to be a mock trial juror. The enrollment form can contain a number of fields requesting personal information for the juror to complete and can also contain participation agreement language. As shown, this information can include name 1502, gender 1504, birth date 1506, race/ethnicity 1508, address 1510, and/or any other suitable information. In response to participation agreement language, a juror can check a box to indicate that he/she has read and agrees to the participation agreement. In some embodiments, upon a juror agreeing to participate, the following can occur: 1) a status message can be displayed thanking the potential juror and alerting him/her to check for an email indicating final approval and an assignment; 2) the juror's record can be added to a list of jurors in a database; and 3) an automated email can be generated and sent to an email address provided by the trial manager informing the trial manager that the juror is registered. Additionally or alternatively, any other suitable actions can occur.

Figure 16:
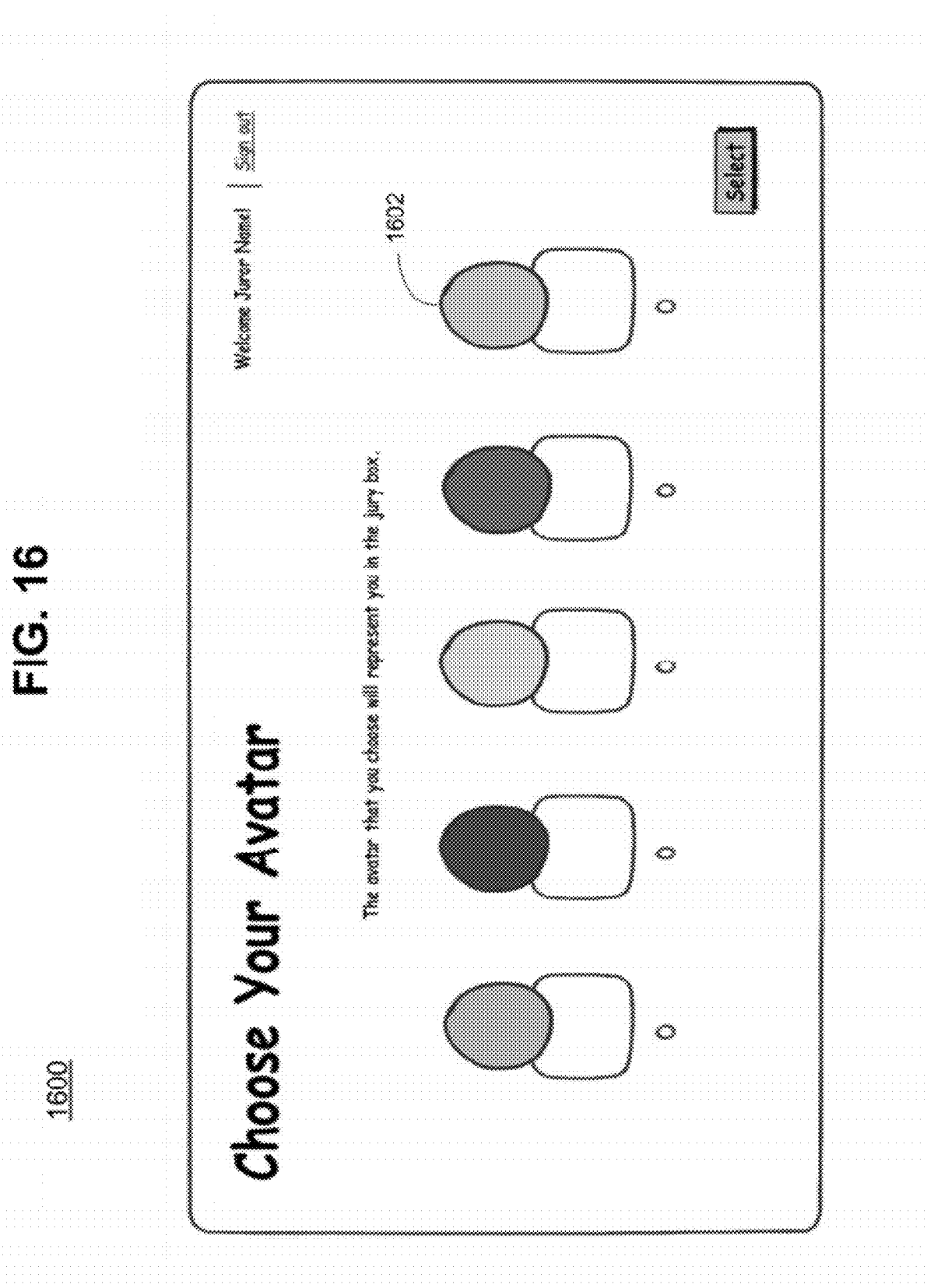
Figure 17:
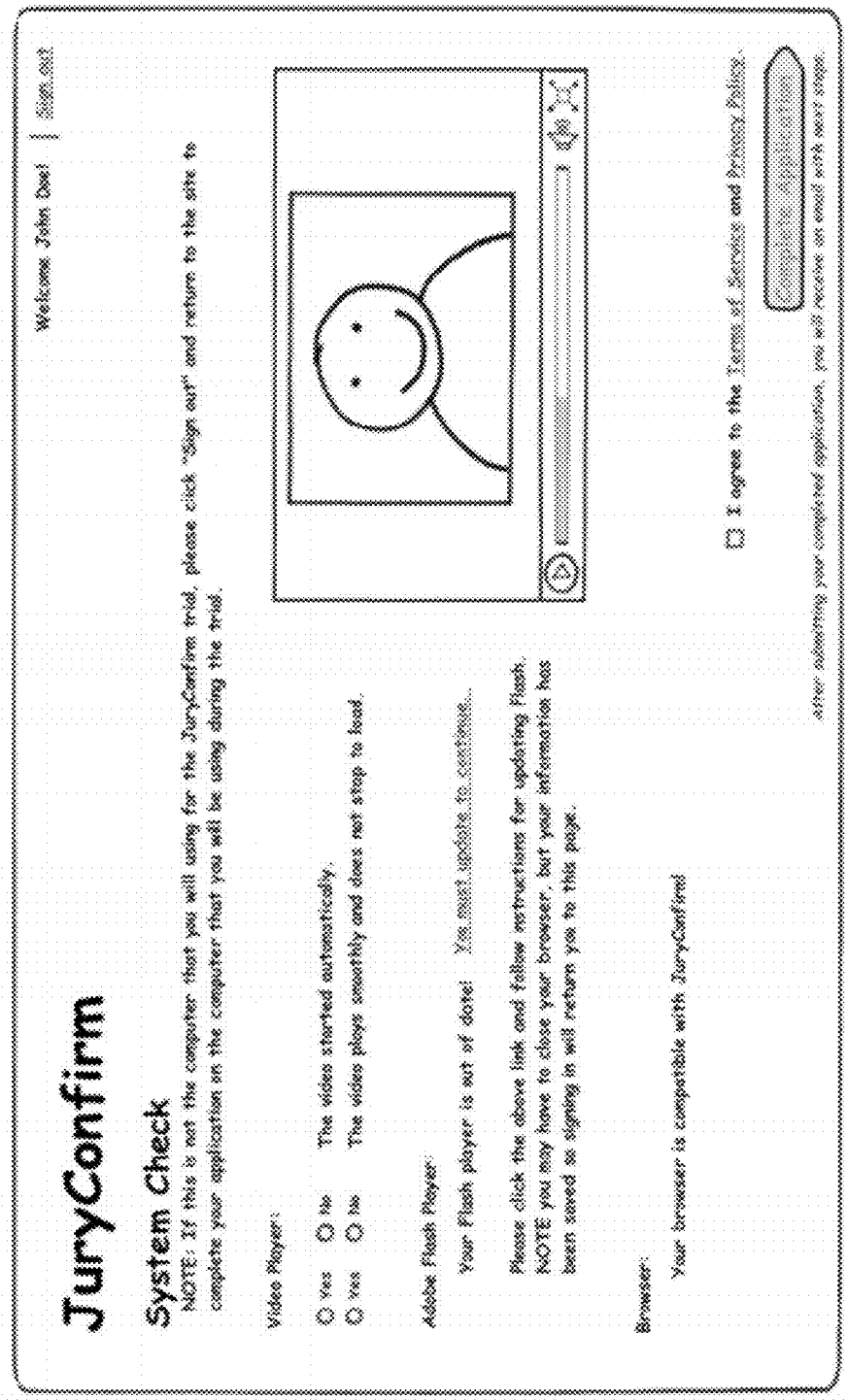
Figure 18:
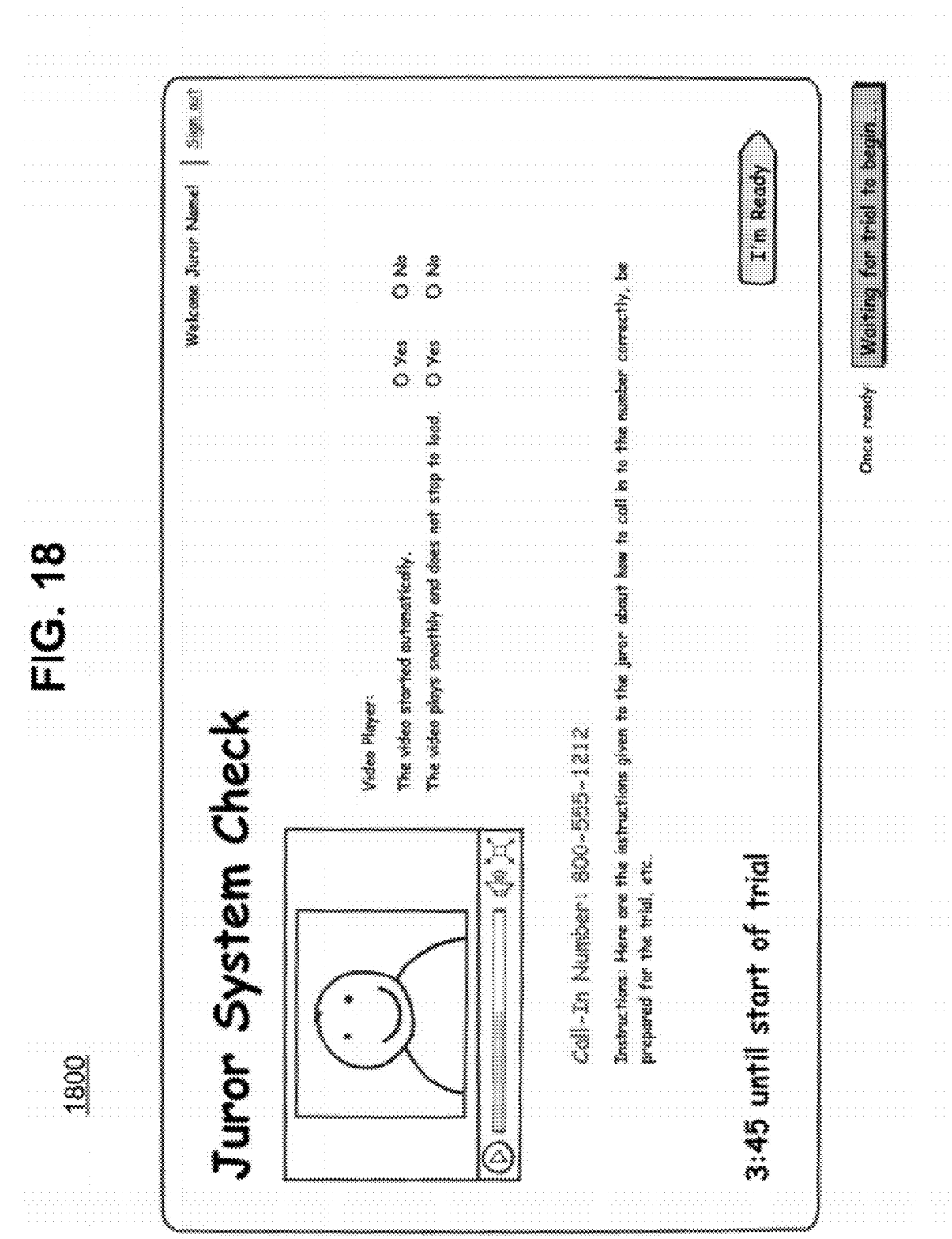

In some embodiments, a juror may be enabled to select an avatar 1602 as illustrated in display screen 1600 of FIG. 16 and/or may upload a photo of himself/herself.

A juror may also be prompted to perform a system check in some embodiments. For example, a juror may receive an email that includes a link back to a system test page. Here potential jurors' connectivity, camera, and operating system can be tested to determine whether they are within given performance bounds as illustrated in example display screens 1700 and 1800 of FIGS. 17 and 18, respectively.

Once a juror has gone through the system test, one of two interface messages may be displayed: a success message or a polite notice declining to work with that juror until the juror has made technology upgrades that can meet minimum system requirements and then re-applies to become a mock trial juror.

As similarly illustrated by a display screen 1900 of FIG. 19A, a lawyer (and/or any other user, such as a client observer) can be required to perform a pre-trial system check. Lawyers (and clients/observers, etc.) can receive deadline reminders to test their cameras and connectivity and to submit materials (which may be for lawyers only).

Figure 19B:
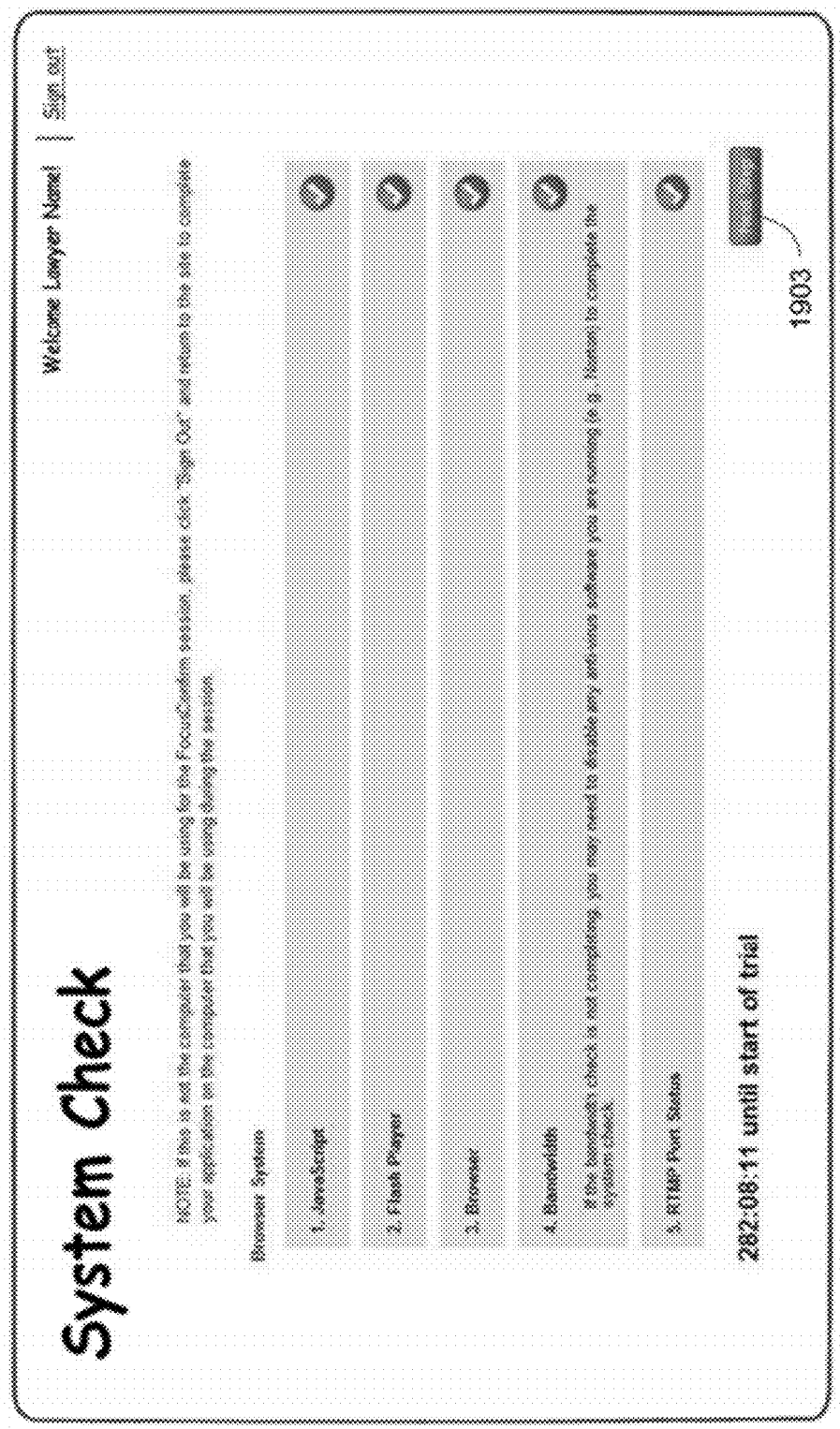
FIG. 19 shows an illustrative display screen that can be used by a lawyer to perform a pre-trial system check in accordance with some embodiments.

In some embodiments, jurors, lawyers, and/or any other user that successfully completes a pre-trial system check may be presented with a display screen 1901 of FIG. 19B. Display screen 1901 indicates that various aspects of a user's system, such as, for example, JavaScript, Flash Player, Browser, Bandwidth, and RTMP Port Status, meet minimum system requirements as indicated by the checkmarks on the right side of the screen. Upon completion of a successful system check, a user may actuate a "Next Step" icon 1903.

Based on the date that a trial manager has set for a mock trial, reminder emails can be automatically sent at any suitable interval(s) to the trial's participants. In some embodiments, participants can receive up to five session reminders. Alternatively, any other suitable number of reminder emails may be sent.

Once a trial has been launched, a trial manager can control a mock trial using interfaces such as the example illustrative display screens of FIGS. 20-30.

Figure 20:
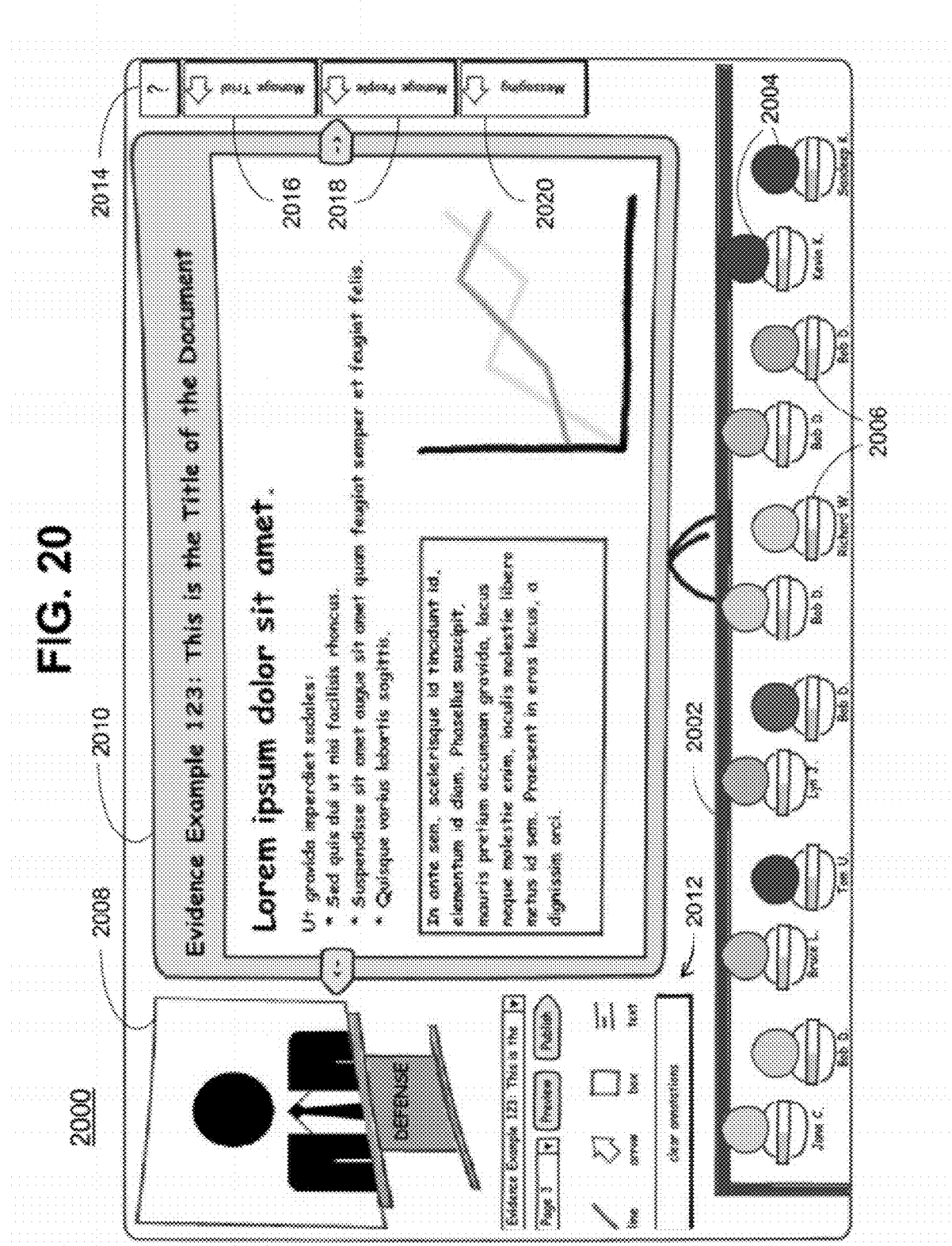
FIGS. 20-30 show illustrative display screens that can be used by a trial manager to control the presentation display of a mock trial in accordance with some embodiments.

As shown in FIG. 20, a mock trial courtroom display screen interface 2000 can be presented. This interface can include a jury section or area 2002 that may include avatars 2004 to represent the jurors forming the mock trial jury. Alternatively or additionally, photos of the jurors, names for the jurors, etc., can be presented. In some embodiments, juror avatars can be dynamic so that in response to being actuated or "moused-over," the avatar may enlarge, an information pop-up may be displayed, and/or the depth perception may shift so that the avatar moves to the front of the view. Any other suitable information and/or effects may be performed additionally or alternatively. In some embodiments, jury section 2002 shows two horizontal juror rows that can be filled in a priority order so the jury seating looks as natural as possible. In some embodiments, dynamic resizing of jurors, or a packing layout, can be used to reflect varying levels of juror participation. An indicator 2006 can be provided in some embodiments for each juror to show how persuaded the juror is by a current argument or presentation (i.e., the juror's persuasion level). Such an indicator can be represented as a bar-graph bar in a box overlapping the juror's avatar (as shown in FIG. 20). Any other suitable indicator can additionally or alternatively be used in some embodiments.

As illustrated in FIG. 20, a lawyer can be presented in a lawyer section 2008 in some embodiments of courtroom display screen 2000. The lawyer may be represented in courtroom interface 2000 by an avatar, picture, live video display via web-cam, etc. Lawyer section 2008 can also indicate whether the lawyer is with the defense or plaintiff.

In some embodiments, an evidence window 2010 can be displayed that shows any suitable evidence to the mock jury. This window can include a title as well as the content of the evidence. Any suitable content can be presented in the evidence window. For example, in some embodiments, PowerPoint documents; Word documents; PDFs; video; animated, still, and/or graphical images; etc. can be presented. When displayed in courtroom display screen 2000, this content can be presented to all or any subset of the mock trial participants.

Annotation tools 2012 (e.g., text, lines, arrows, rectangles, etc.) can be provided in some embodiments to enable the trial manager, lawyer, etc. to annotate evidence for display to the jurors. Such users can be enabled to live-annotate exported presentations and images, which can be visible to users logged in to the trial at that time. Annotated files can be locally cached on user devices/machines. In some embodiments, trial managers can call up previously annotated images for trial participants.

The courtroom view shown in FIG. 20 can also include menu options (shown here on the right edge of display screen 2000), such as, for example, a help option 2014, a Managing Trial option 2016, a Managing People option 2018, and a Messaging option 2020. Additionally or alternatively, other suitable menu options can be provided in display screen 2000 in some embodiments.

Figure 21:
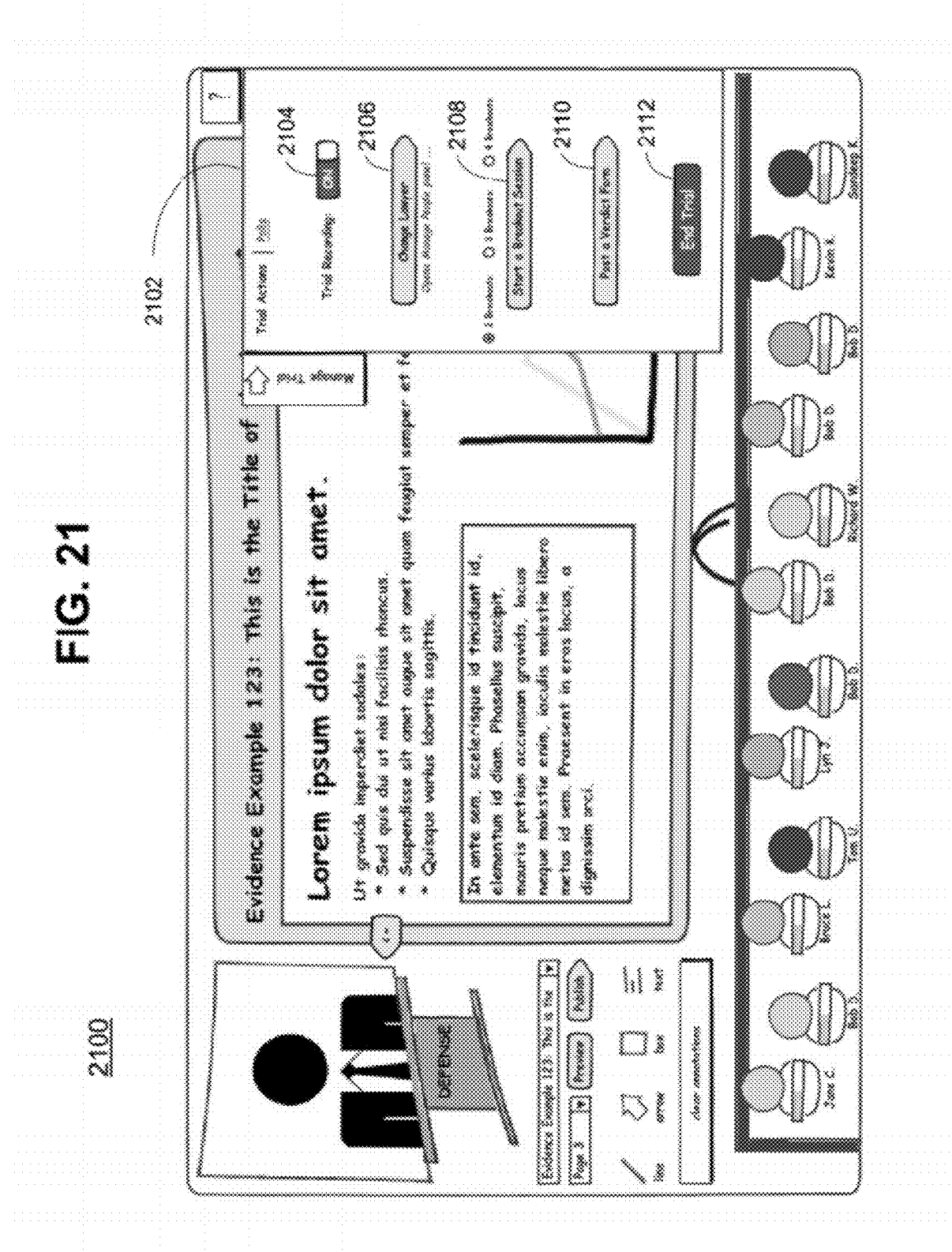

In response to actuating Managing Trial option 2016, a managing trial window 2102 opens in display screen 2100 of FIG. 21 in some embodiments. In window 2102, a trial manager can turn recording of the trial on/off by actuating icon 2104, change the lawyer who is presenting to the jury by actuating icon 2106, start any suitable number of breakout sessions by actuating icon 2108, post a verdict form by actuating icon 2110, end the trial by actuating icon 2112, and/or perform any other suitable function.

Figure 22:
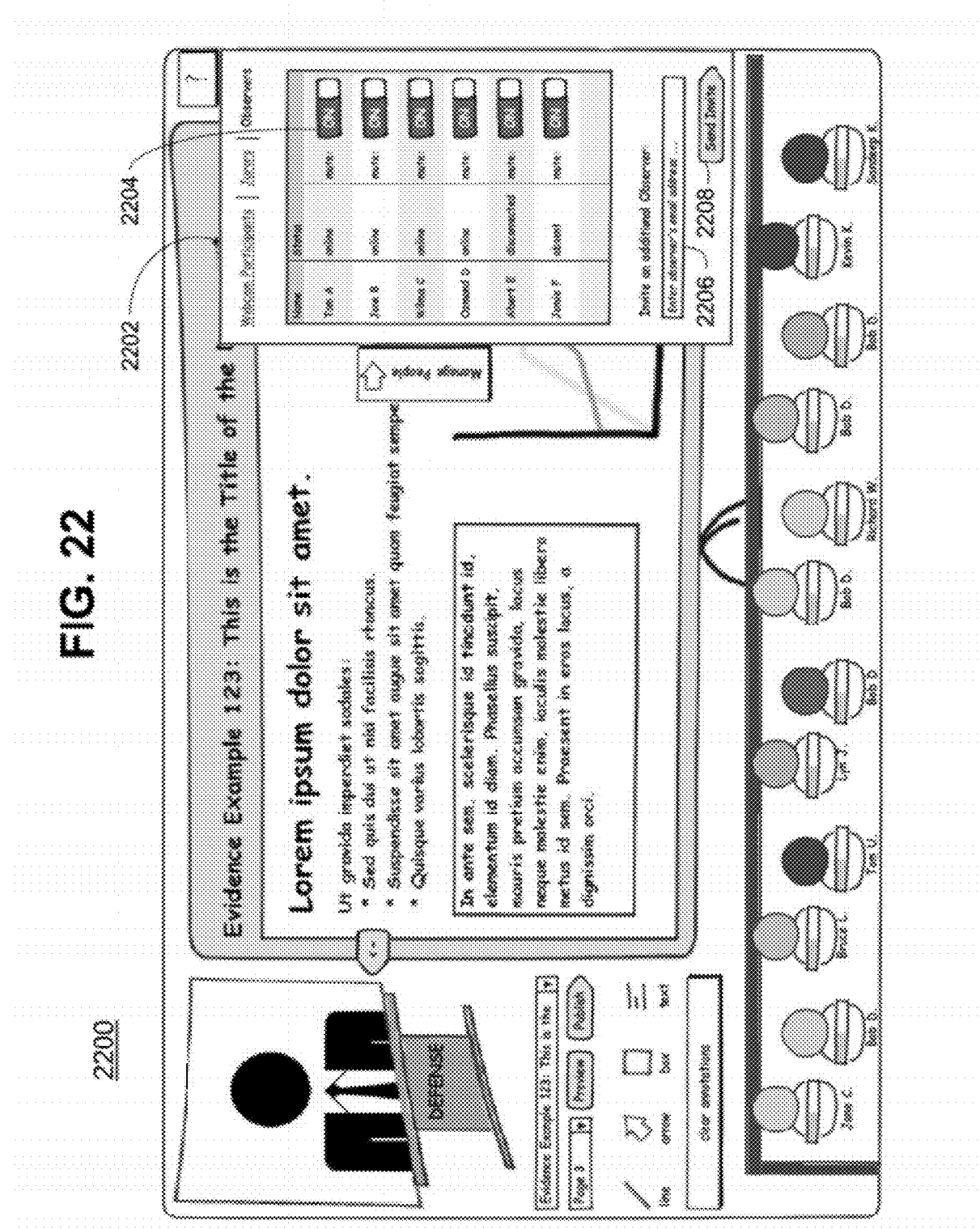
Figure 23:
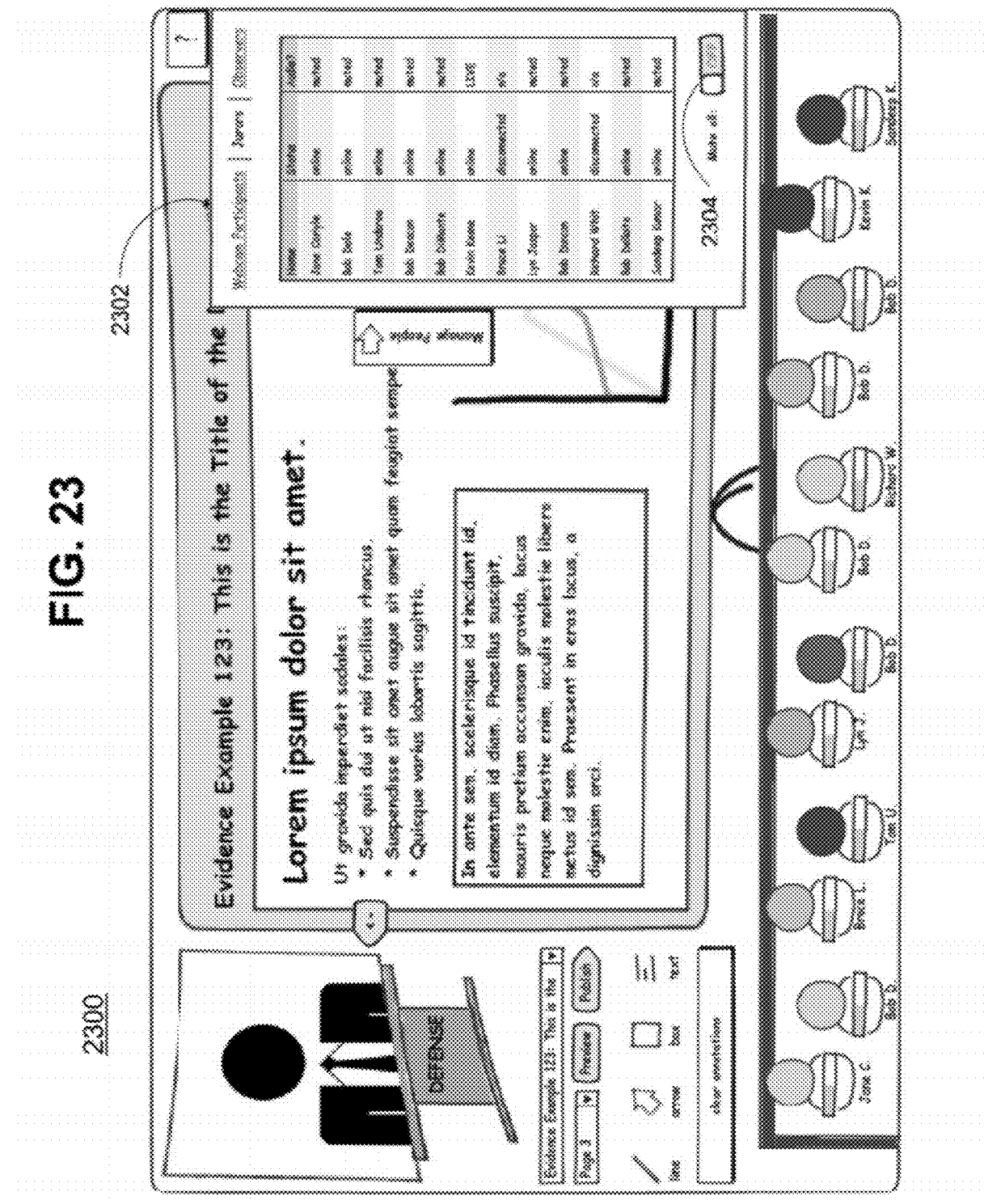

FIGS. 22 and 23 illustrate examples of interfaces via which a trial manager can view status and can control the audio of different user types by actuating the managing people option. For example, using the interface display screen 2200 of FIG. 22, the manager can view a list of observers in a window 2202 that shows the names of the observers, their online status, and their audio status. The trial manager can control whether the observer's audio is muted or not by actuating an icon 2204 for a particular observer. In some embodiments, the trial manager can additionally invite other observers by using a data entry field 2206 and a send invite icon 2208. Similarly, using the interface display screen 2300 of FIG. 23, the trial manager can view a list of mock trial jurors in a window 2302 that shows the names of the jurors, their online status, and their audio status. The trial manager can control whether or not to mute all of juror's audio by actuating an icon 2304.

Figure 24:
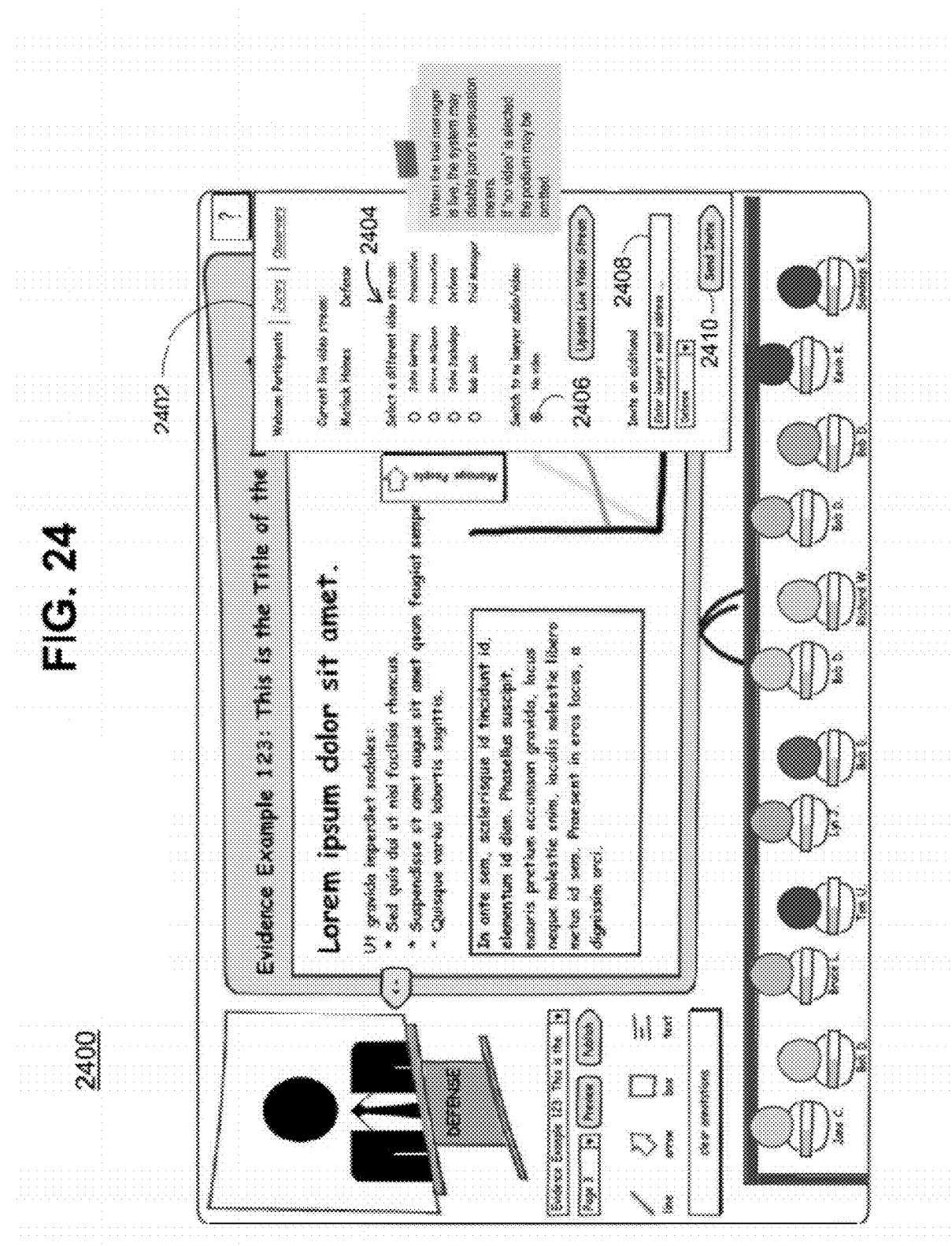

FIG. 24 illustrates an example of an interface that can be used by a trial manager to manage the lawyers participating in a mock trial. In some embodiments, a window 2402 opens in a display 2400 in response to actuating the managing people option. The trial manager can view the lawyer presenting (in this example, Matlock Holmes for the defense), select a different lawyer to present by actuating one of options 2404, or switch to no lawyer presenting by actuating icon 2406. Additional lawyers can also be invited in some embodiments by using a data entry field 2408 and a send invite icon 2410.

In some embodiments, a trial manager and/or a juror can be alerted when the juror is distracted. This can be determined, for example, by the juror dropping off a conference call, not responding to an on-screen participation verification check, opening another window in the foreground of the juror's computer or user device, not adjusting his/her persuasiveness level for a given period of time, not answering poll questions, etc.

Figure 25:
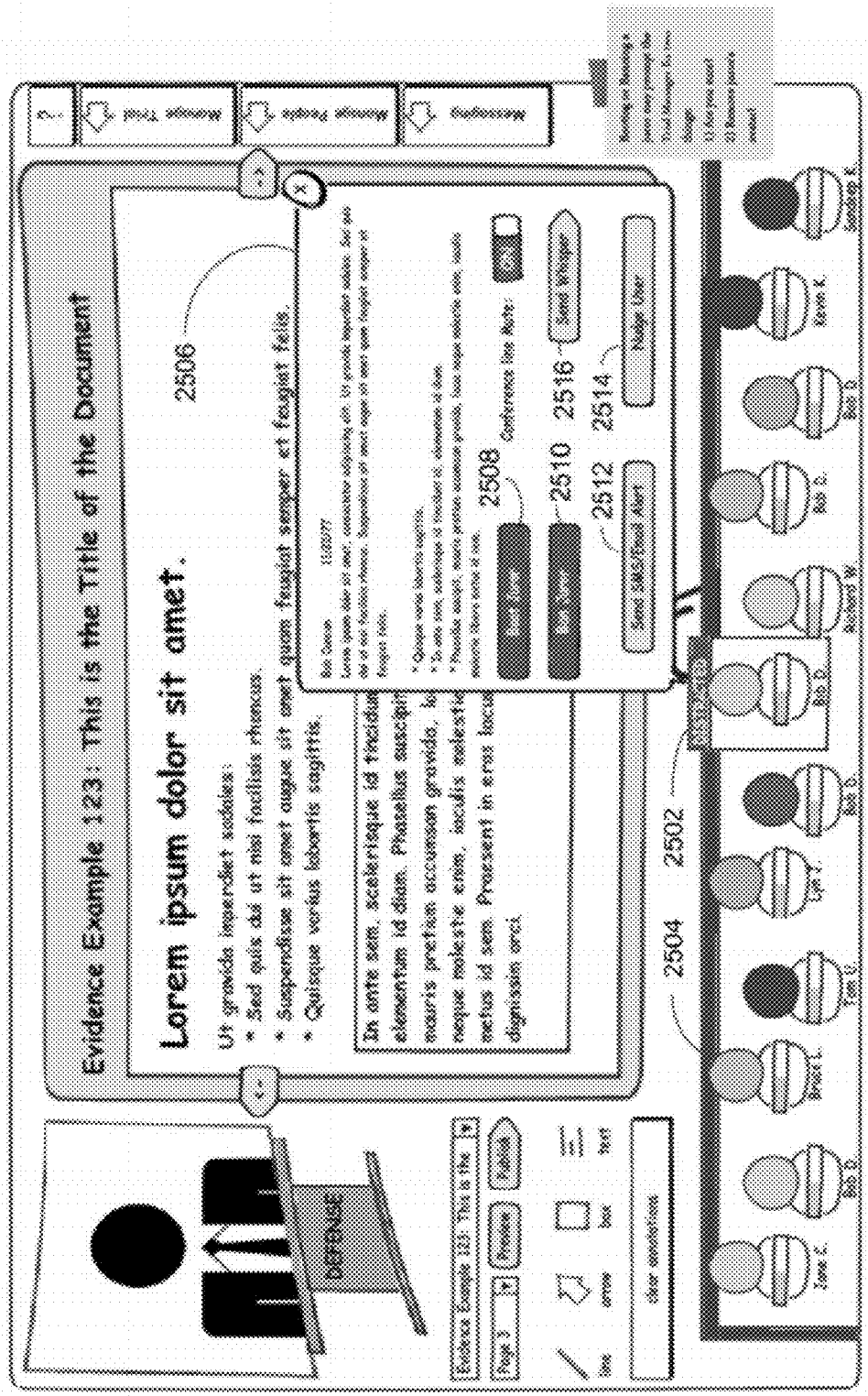

FIG. 25 illustrates an example of an interface that can be used in some embodiments by a trial manager in response to a distracted juror. As shown in a display screen 2500, a distracted juror 2502 is indicated in a jury section 2504. In response to such an indication, a juror distraction window 2506 opens in display screen 2500. The trial manager can dismiss (or "boot") the juror by actuating an icon 2508, ban the juror by actuating an icon 2510, send an SMS or email message to the juror by actuating an icon 2512, nudge the juror by actuating an icon 2514, send a whisper to the juror (described below) by actuating an icon 2516, and/or take any other suitable action. For example, a trial manager can nudge a juror by causing that juror's display window to shake and/or by causing that user's computer or user device to emit a sound. Booting and/or banning the juror may result in the termination of the transmission of the mock trial presentation display to the distracted juror in some embodiments.

Figure 26:
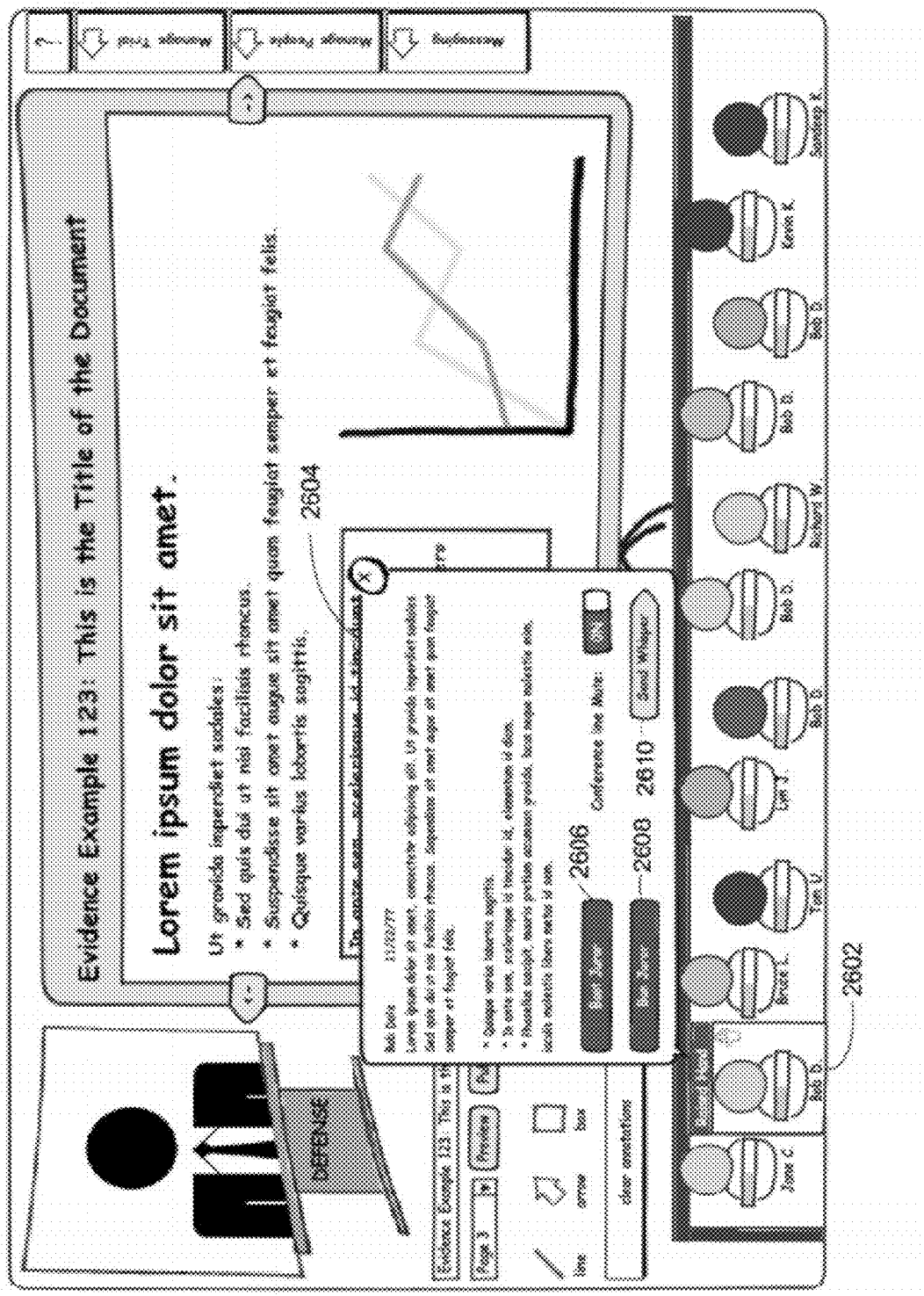

Turning to FIG. 26, when a juror wishes to communicate (e.g., by "raising his or her hand"), the trial manager can be alerted in some embodiments by a raised-hand juror 2602 as shown in a display screen 2600. In response, a window 2604 opens in which the manager can dismiss or boot the juror by actuating an icon 2606, ban the juror by actuating an icon 2608, send a whisper to the juror (described below) by actuating an icon 2610, and/or take any other suitable action.

Figure 27:
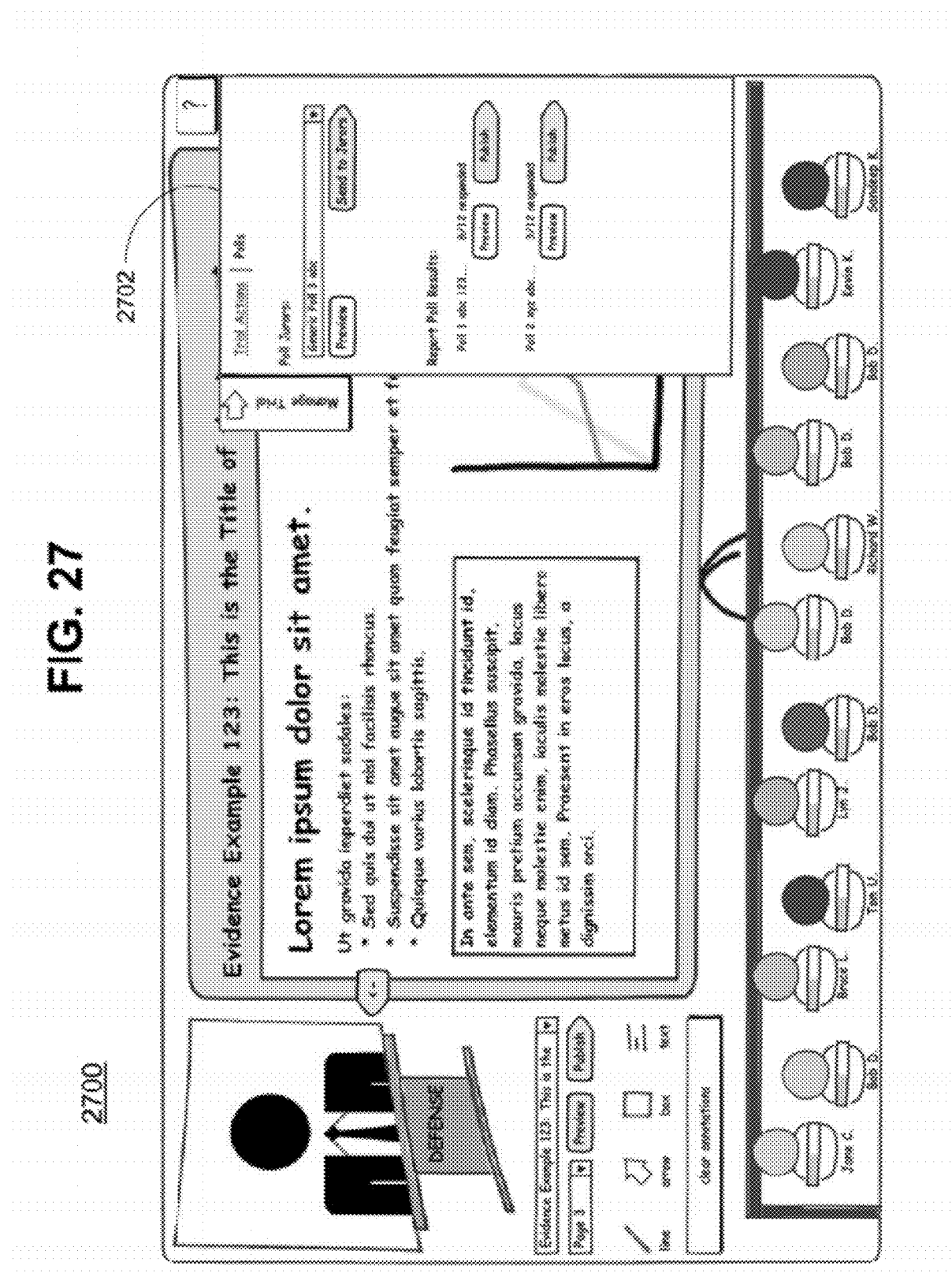

FIG. 27 illustrates an example of an interface for selecting a poll to be presented to users and for previewing and publishing the results of such a poll. In response to actuating the managing trial option, a polling window 2702 opens in a display screen 2700. An editable library of questionnaires can be provided for polling (as described above). From this library, questionnaire(s) to be displayed at a particular mock trial can be selected. In some embodiments, the questionnaires may be displayed to jurors/forepersons only. In some embodiments, questionnaires can be displayed automatically upon an attorney's indicating that he or she is done with a particular segment or presentation of a mock trial.

Figure 28:
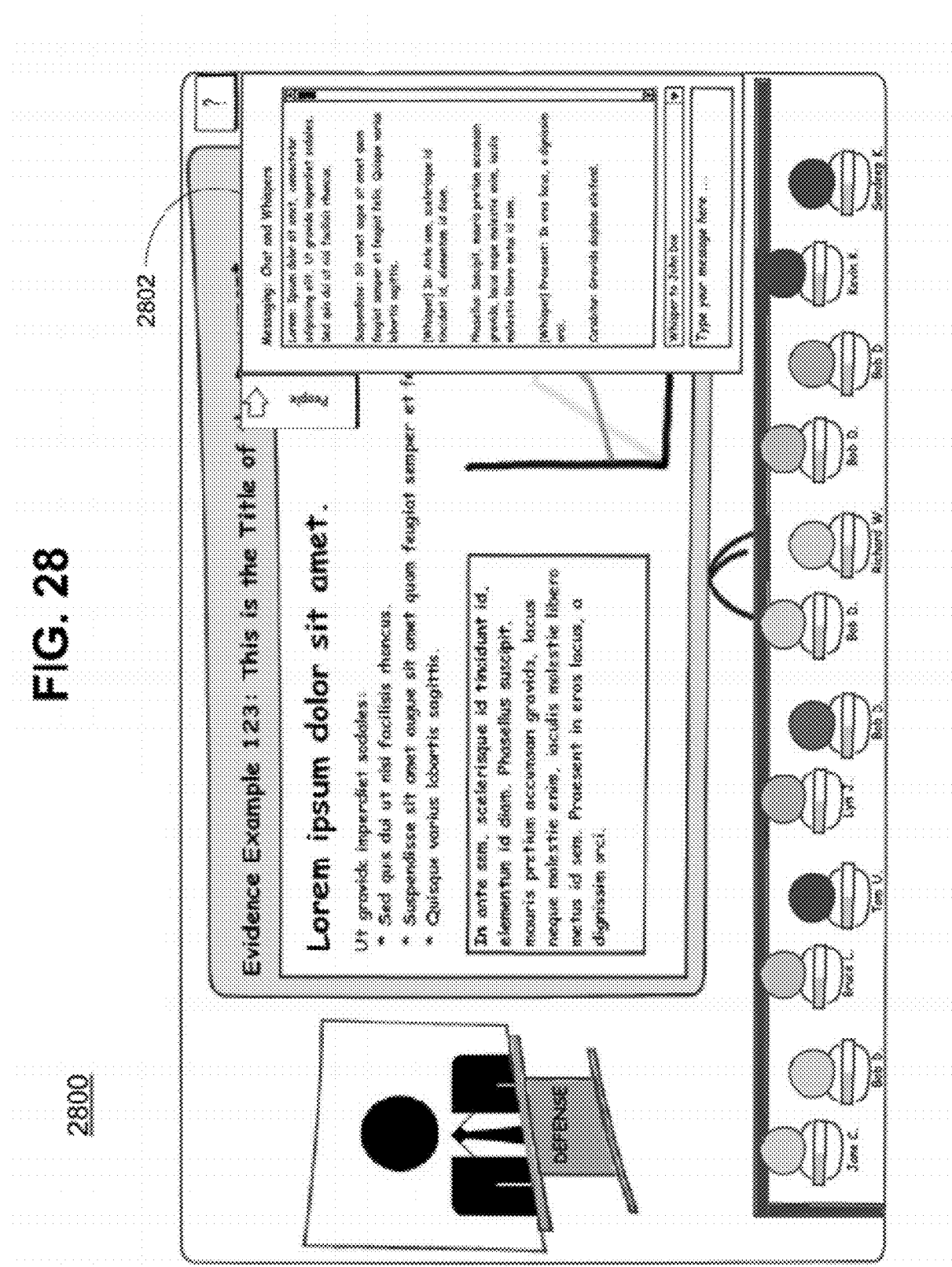

A chat or whisper window can be presented to users in some embodiments as illustrated in FIG. 28. As shown, a chat/whisper window 2802 can open in a display screen 2800. This window can be presented in response to a user other than the trial manager initiating the chat, or can be presented in response to the trial manager selecting the messaging option. In some embodiments, jurors may only be able to chat with certain types of users, such as trial managers. Clients, observers, and trial managers may be able to chat with each other, in some embodiments, either all at once or with select individual users with these roles.

Figure 29:
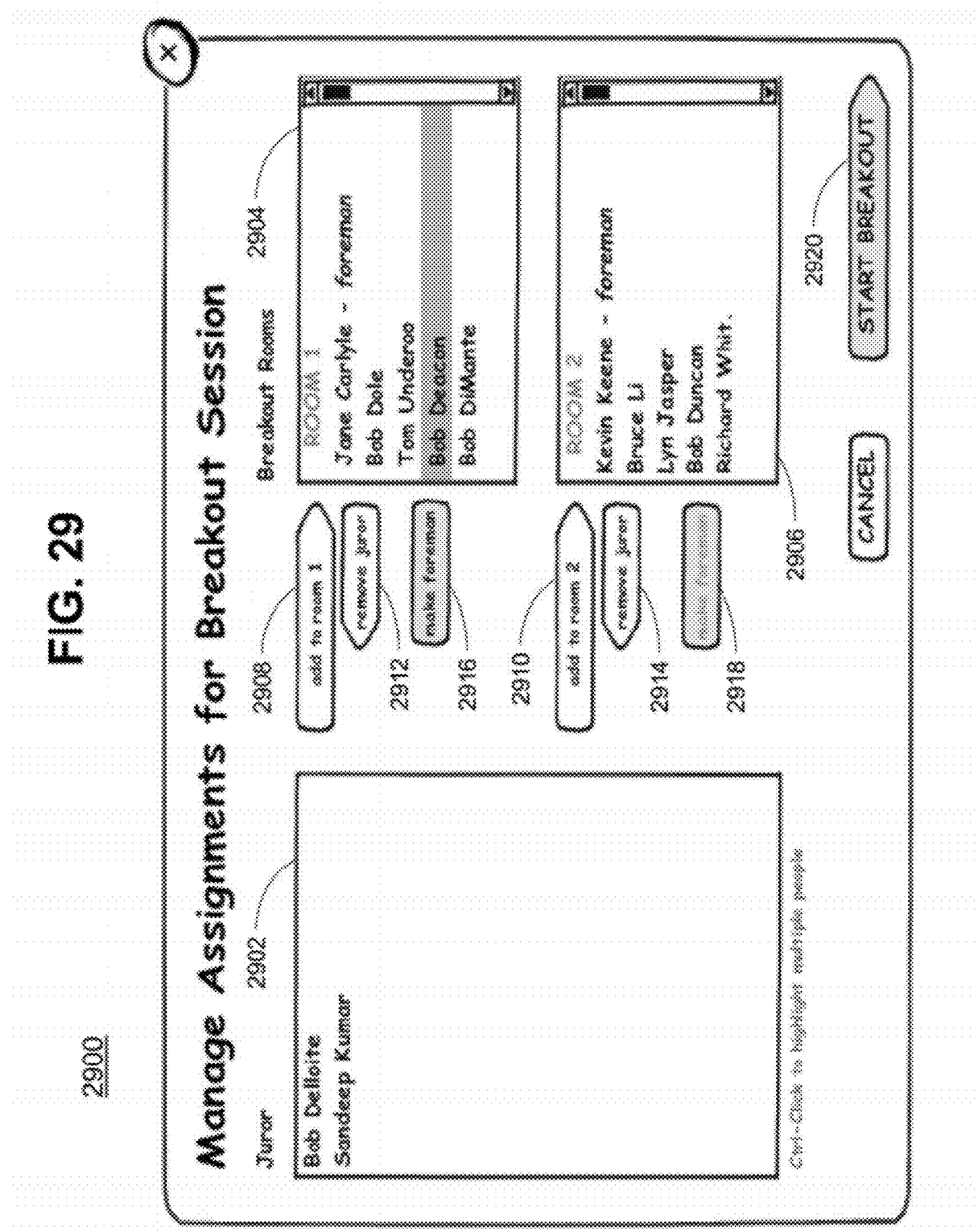
Figure 30:
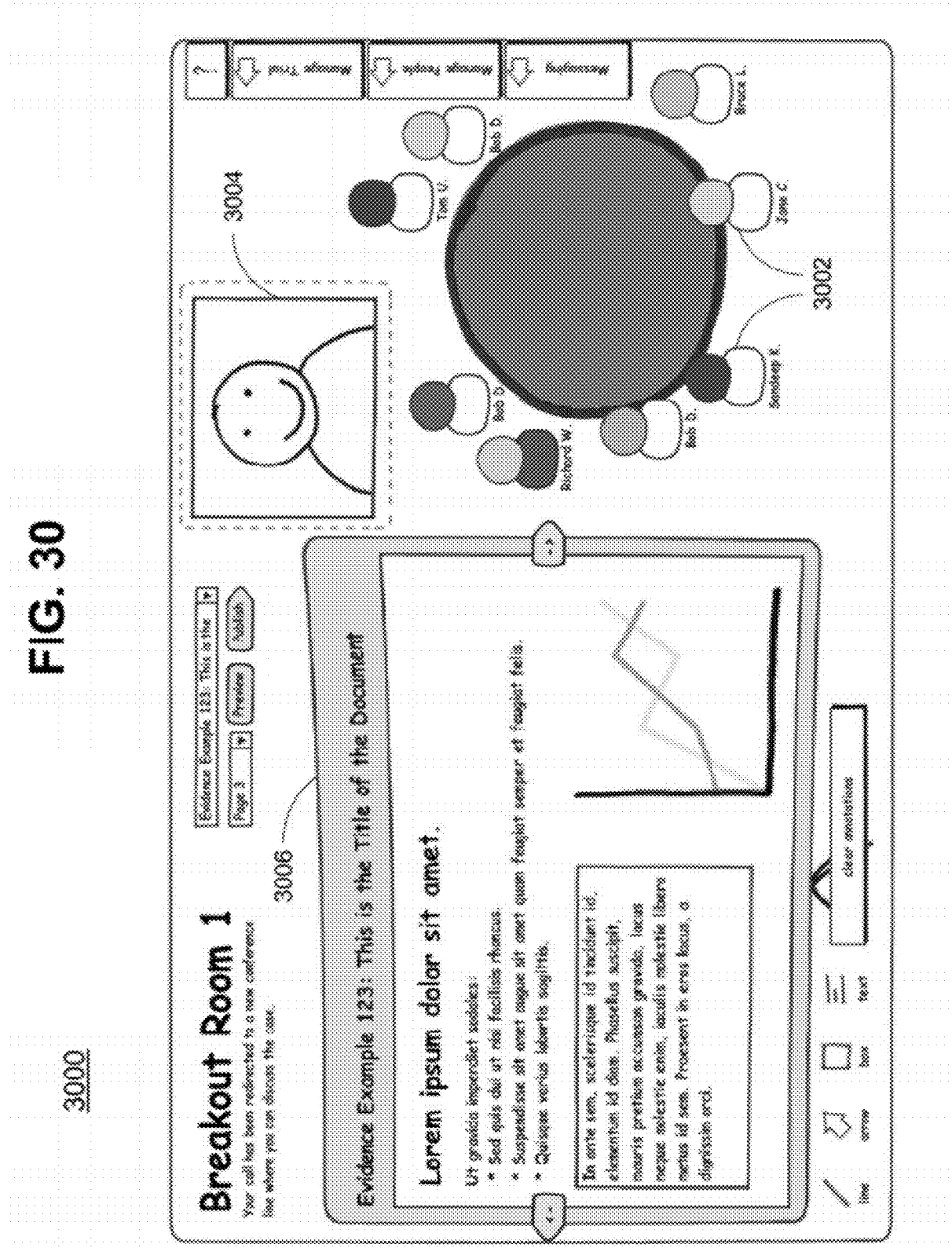

FIGS. 29 and 30 illustrate examples of interfaces for breakout sessions. As shown in a display screen 2900 of FIG. 29, a trial manager can manage assignments for various breakout sessions in different rooms by using, for example, a juror window 2902, a breakout room #1 window 2904, and a breakout room #2 window 2906. A trial manager can add selected jurors to breakout rooms by using icons 2908 and 2910, remove jurors from breakout rooms by using icons 2912 and 2914, select a juror as a foreperson by using icons 2916 and 2918, start a breakout session by using an icon 2920, and/or by performing any other suitable action.

In some embodiments, jurors can be automatically assigned to a breakout room upon triggering a breakout session based on juror demographics, persuasion levels, etc. This can be done to automatically split the jurors into reasonably diverse groups. Any suitable number of attributes, such as poll answers, gender, ethnicity, age, etc., can be considered.

Once in the breakout room, as illustrated in FIG. 30, jurors' avatars 3002, images 3004, etc. can be displayed in a breakout room display screen 3000. Evidence can also be displayed and annotated in an evidence window 3006 of display screen 3000. Breakout room display screen 3000 can further display verdict forms that can be filled out by the participants in the breakout room. In some embodiments, participants in a particular breakout room can talk to each other via a video conference, audio conference, chat session, and/or any other suitable communication method. For example, breakout room participants can be programmatically bridged into one conference call number for a mock trial and then into separate conference call numbers for deliberation breakouts. In this way, the jurors can discuss their reactions to the arguments they have heard.

Observers and/or lawyers can monitor a mock trial using interfaces such as the example illustrative display screens of FIGS. 31-35.

Figure 31:
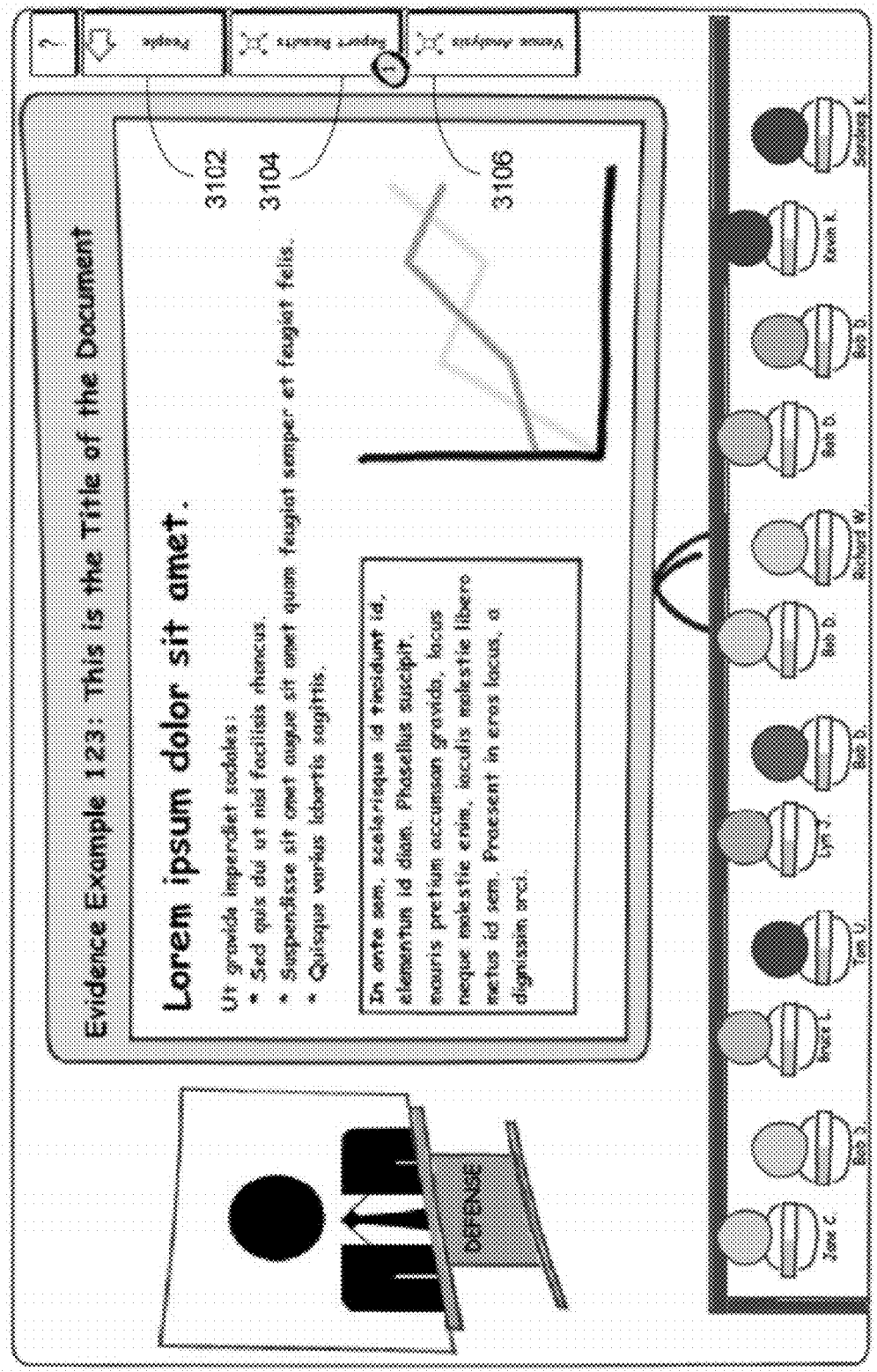
FIGS. 31-35 show illustrative display screens that can be used by observers and/or lawyers to monitor a mock trial in accordance with some embodiments.

As shown in FIG. 31, a courtroom interface display screen 3100 similar to that shown in FIG. 20 can be presented to clients/observers in accordance with some embodiments. Unlike the interface in FIG. 20, however, interface display screen 3100 can include different menu options, such as, for example, a People option 3102, a Report Results option 3104, and a Venue Analysis option 3106, because the client/observer user type may not be permitted to manage the trial or people.

Figure 32:
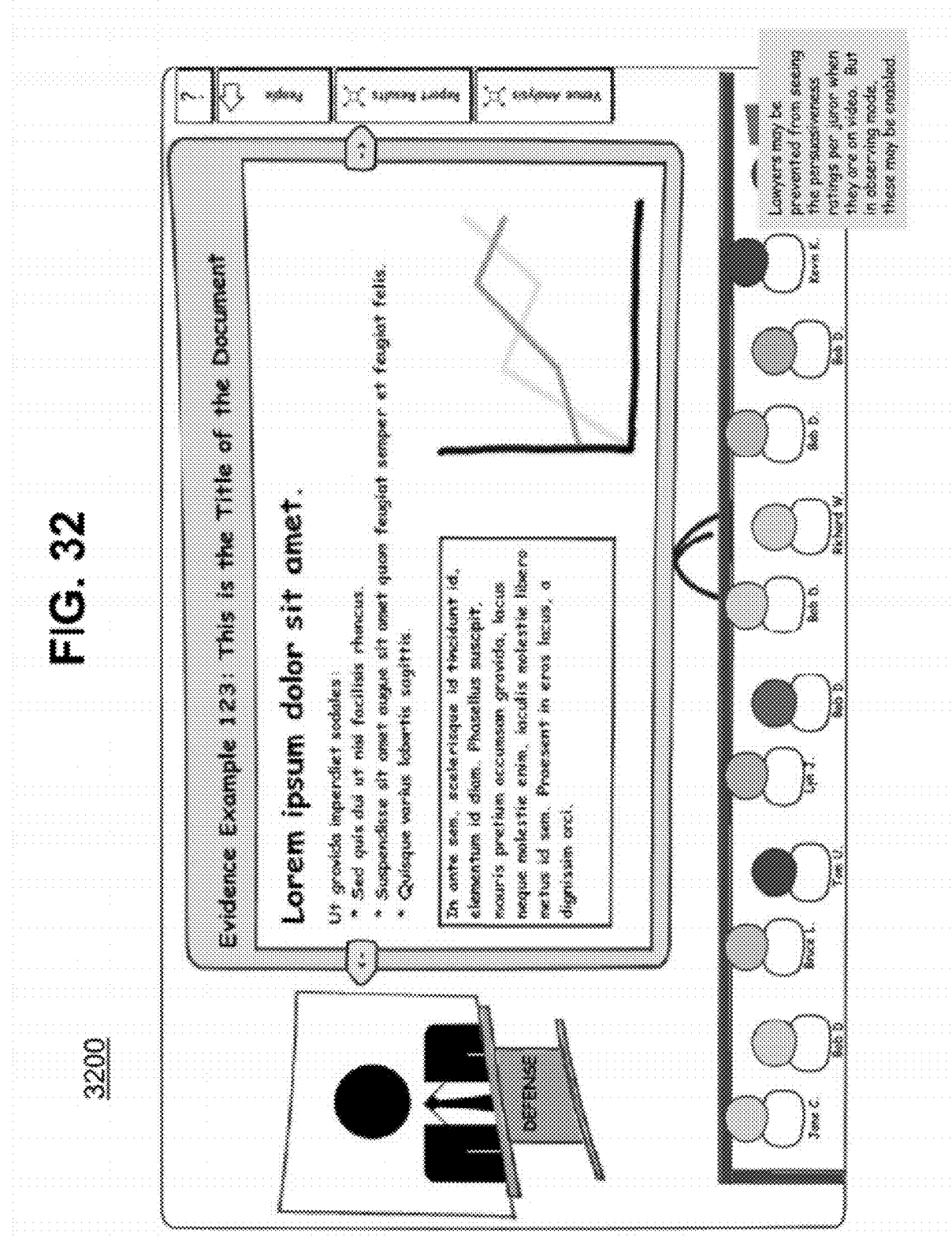

In accordance with some embodiments, FIG. 32 illustrates an interface display screen 3200 similar to interface display screen 3100 that may be presented to lawyer participants except that, as shown, persuasiveness levels may not be presented to lawyers when arguing so that their argument is not dynamically given feedback by the mock jurors.

Figure 33:
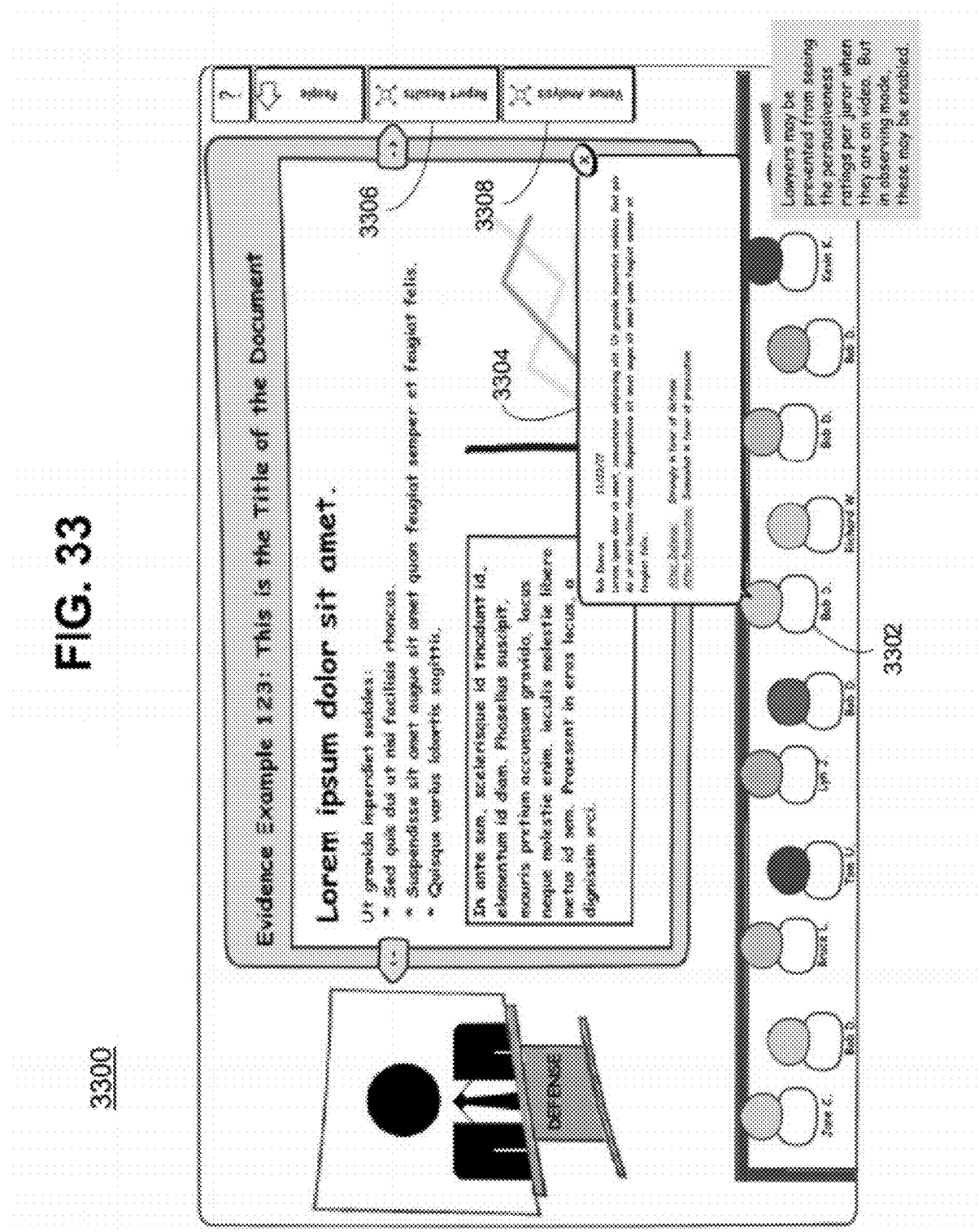

As shown in a display screen 3300 of FIG. 33, a lawyer can in some embodiments "mouse-over" or actuate a juror representation 3302 to view profile information 3304 pertaining to that juror. Certain details in this profile information may be time dependent, such as the juror's persuasiveness level after, for example, the plaintiffs case has been presented and/or after the defense's case has been presented.

Figure 34:
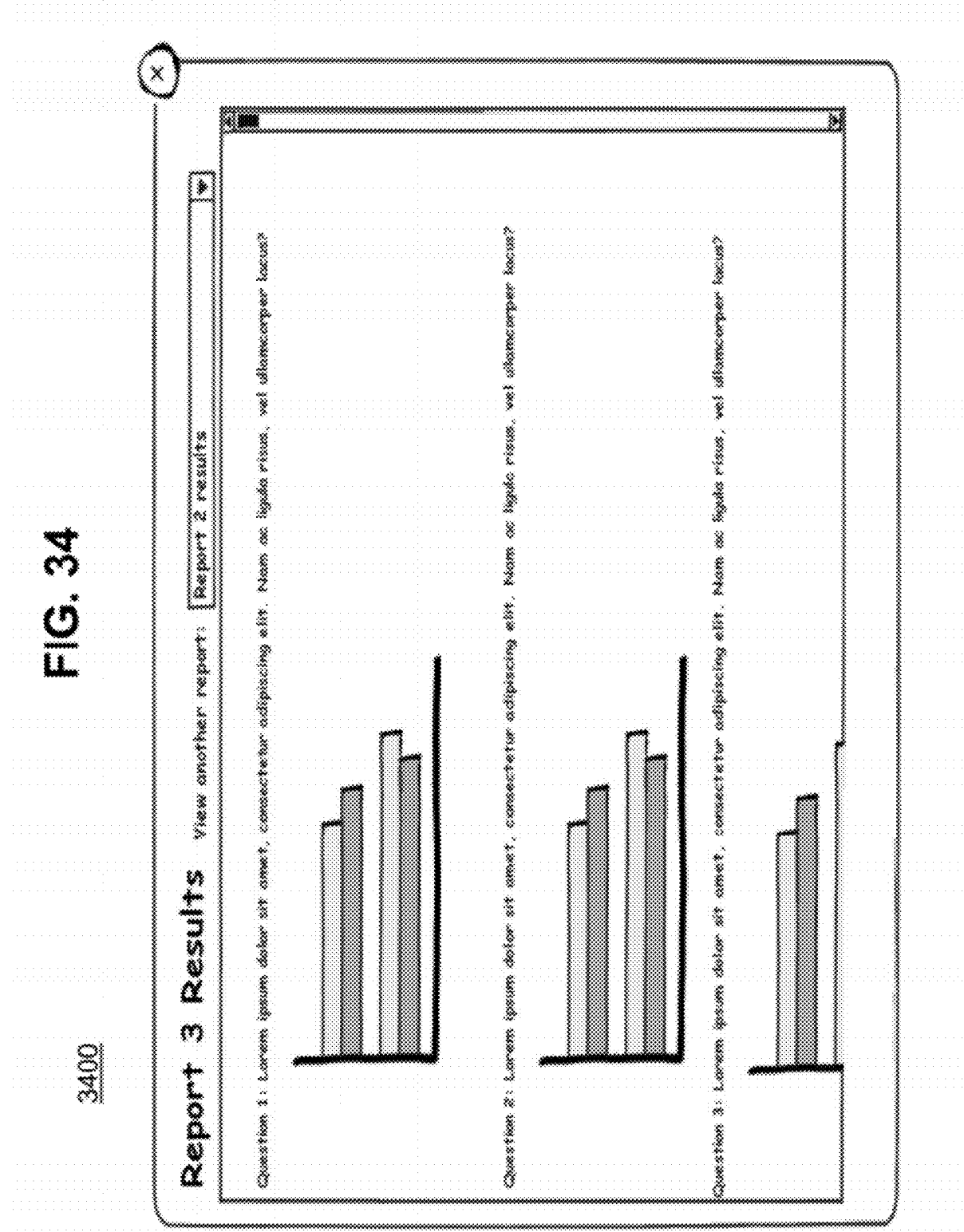

Lawyers and clients/observers may be able in some embodiments to view poll/questionnaire results as illustrated in a display screen 3400 of FIG. 34 by selecting the report results option (such as Report Results option 3104 of FIG. 31 or Report Results option 3306 of FIG. 33). Results of polling may be shown as bar graphs. The trial manager can have the ability to restrict access to this function so that it is only available at certain times (such as, for example, during the mock trial, after a plaintiff presentation, after a defendant presentation, after a summation argument, after the mock trial, etc.).

Figure 35:
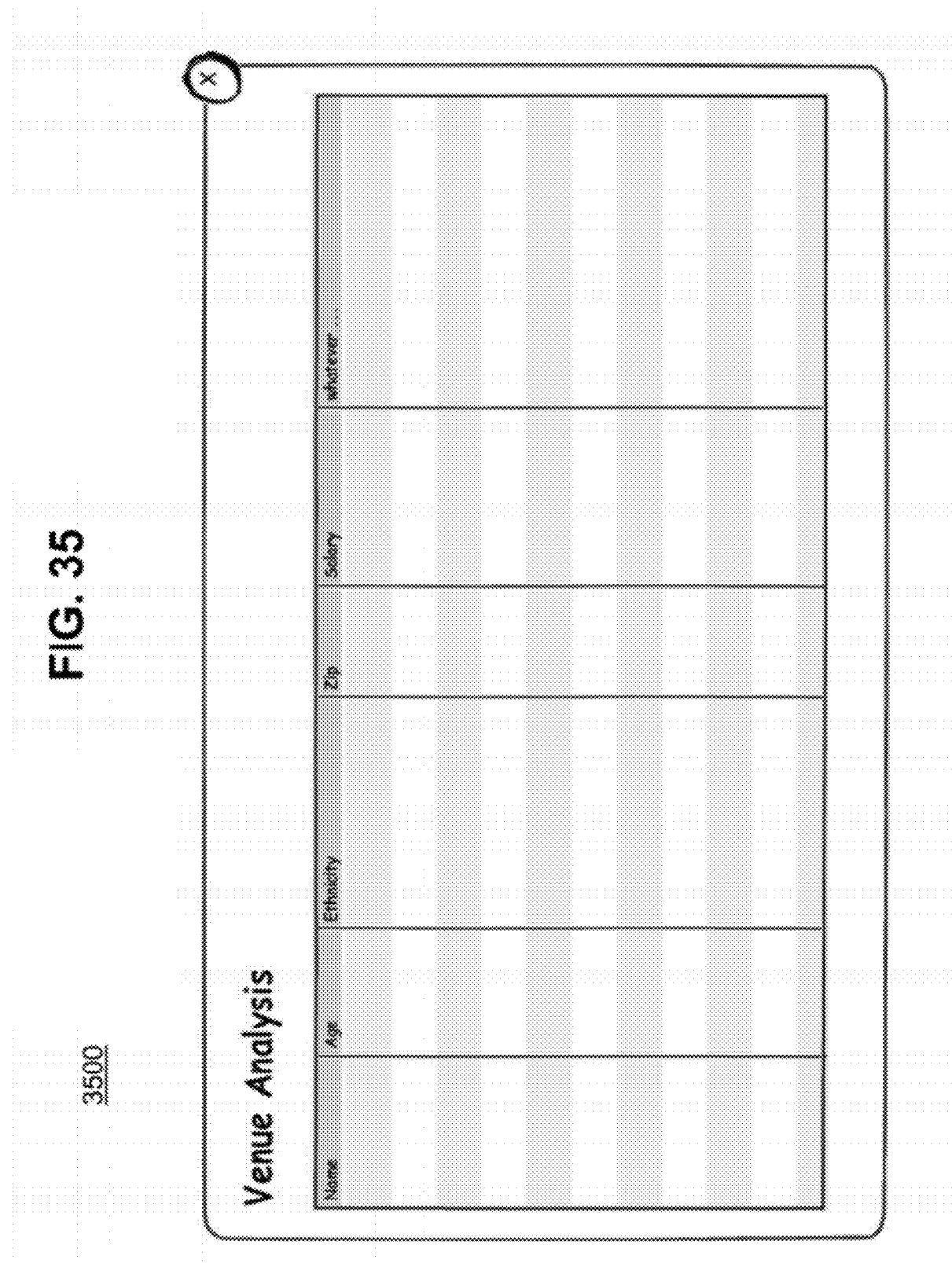

In some embodiments, a venue interface similar to that described above in connection with FIG. 6 can be presented as illustrated by a display screen 3500 of FIG. 35 in response to selecting the venue option (such as Venue Analysis option 3106 of FIG. 31 or Venue Analysis option 3308 of FIG. 33).

Mock jurors can participate in a mock trial using interfaces such as the example illustrative display screens of FIGS. 36-40 in accordance with some embodiments.

Figure 36:
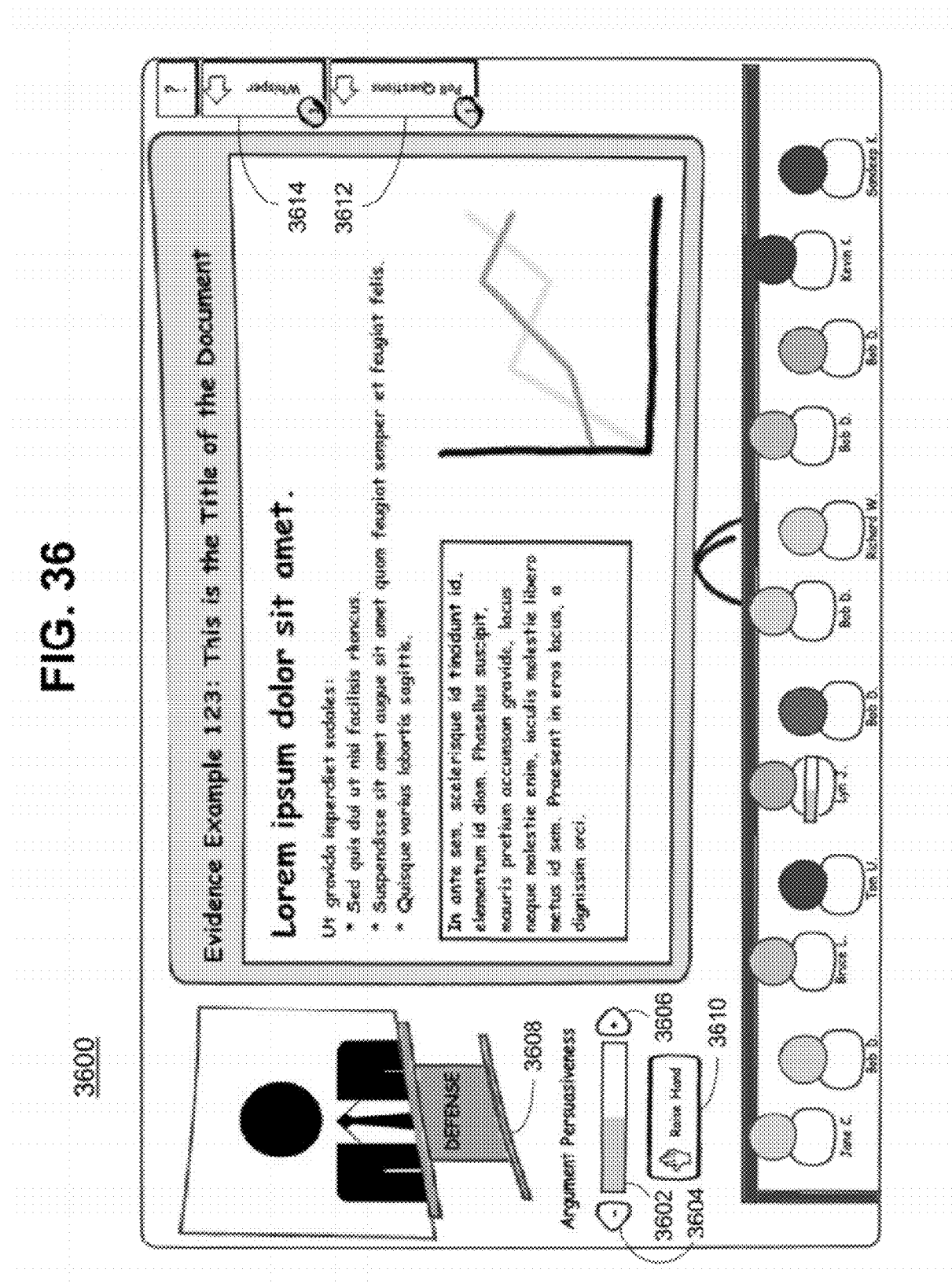
FIGS. 36-40 show illustrative display screens that can be used by mock jurors to participate in a mock trial in accordance with some embodiments.

As shown in FIG. 36, a courtroom interface display screen 3600 similar to that shown in FIG. 20 can be presented to jurors. As illustrated, however, the juror may only be shown the persuasiveness level 3602 for that juror. This persuasiveness level may be set by the juror by adjusting plus and minus persuasiveness bar icons 3604 and 3606, respectively, under a lawyer icon 3608. The juror may also be given a button 3610 to "raise his/her hand" to ask a question of the trial manager or lawyer (e.g., if the lawyer gives permission). A chat window may then be presented for the juror to ask his/her question. In some embodiments, the jurors can be prevented from seeing the names of clients/observers viewing the mock trial and will not be able to contact clients/observers.

Figure 37:
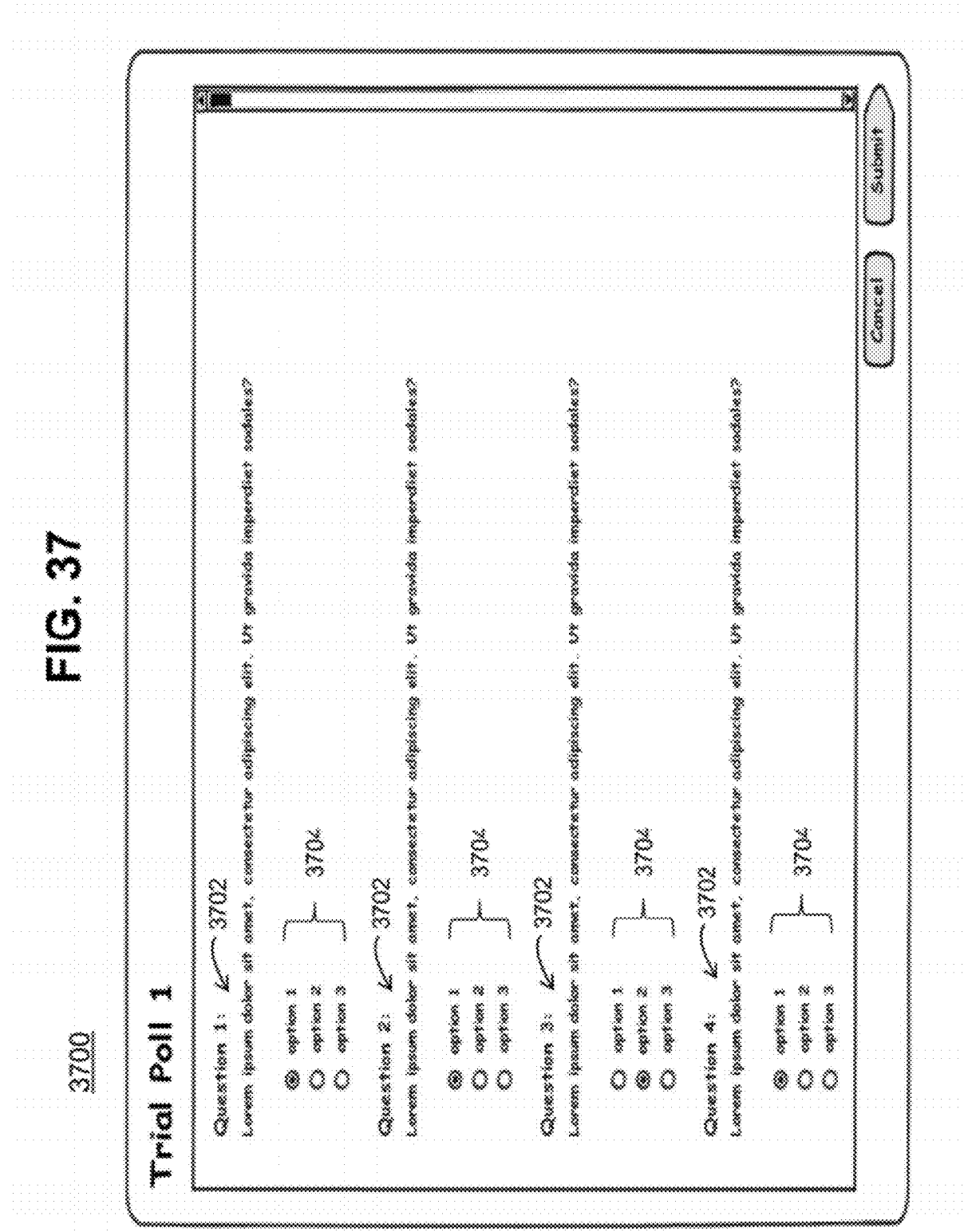
Figure 38:
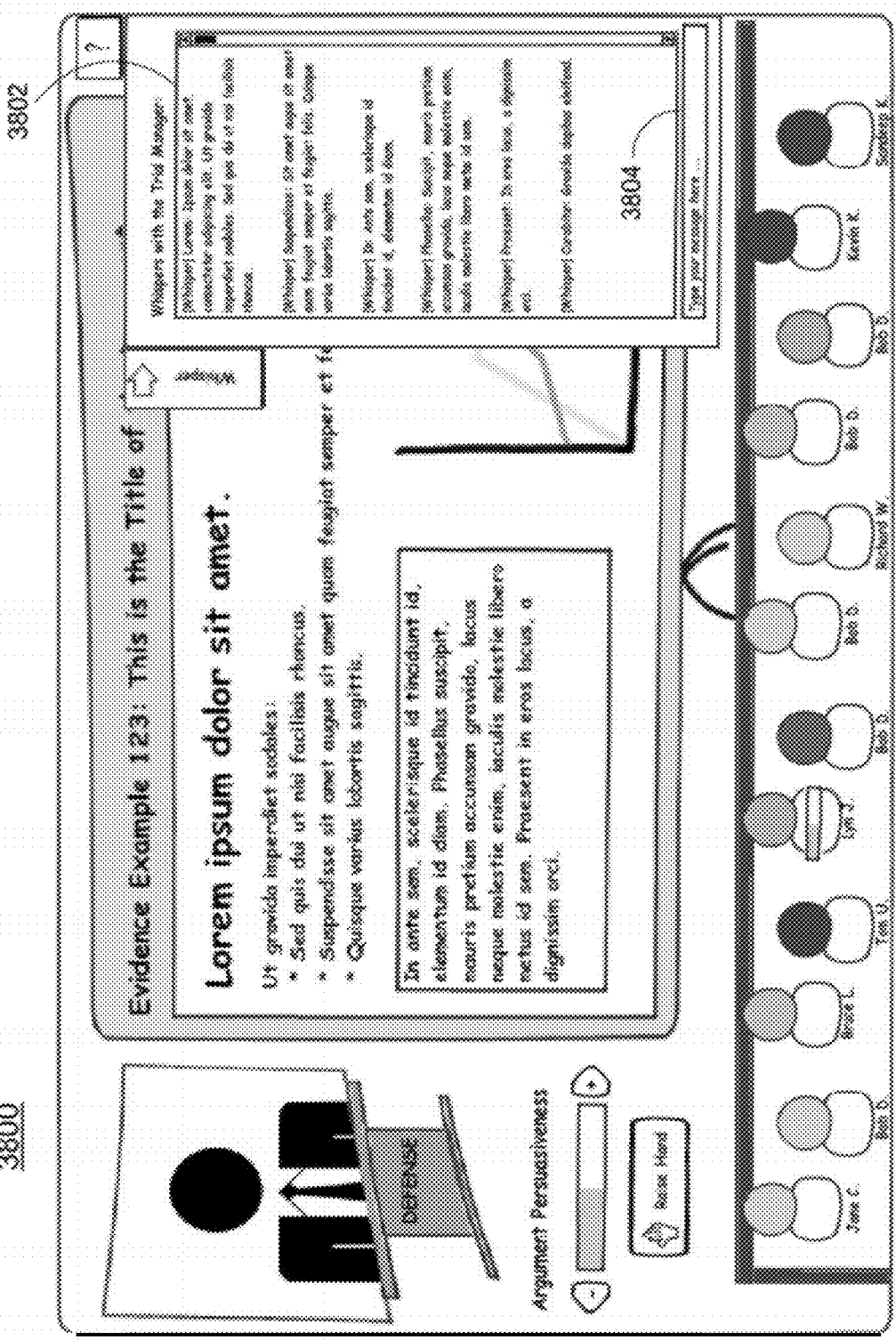

In some embodiments, interface display screen 3600 can also present a juror with menu options to "whisper" and see "poll questions." Upon selecting a poll questions option 3612 in FIG. 36, a juror may be presented with a poll screen display 3700 as shown in FIG. 37 in accordance with some embodiments. Poll screen display 3700 may present the juror with a series of questions 3702 each requiring a selection of one of a several multiple choice responses 3704. Upon selecting a whisper option 3614 in FIG. 36, a juror may be presented with a chat window 3802 of display screen 3800 as illustrated in FIG. 38 in accordance with some embodiments. The juror may type a message in message field 3804 of the chat window.

Figure 39:
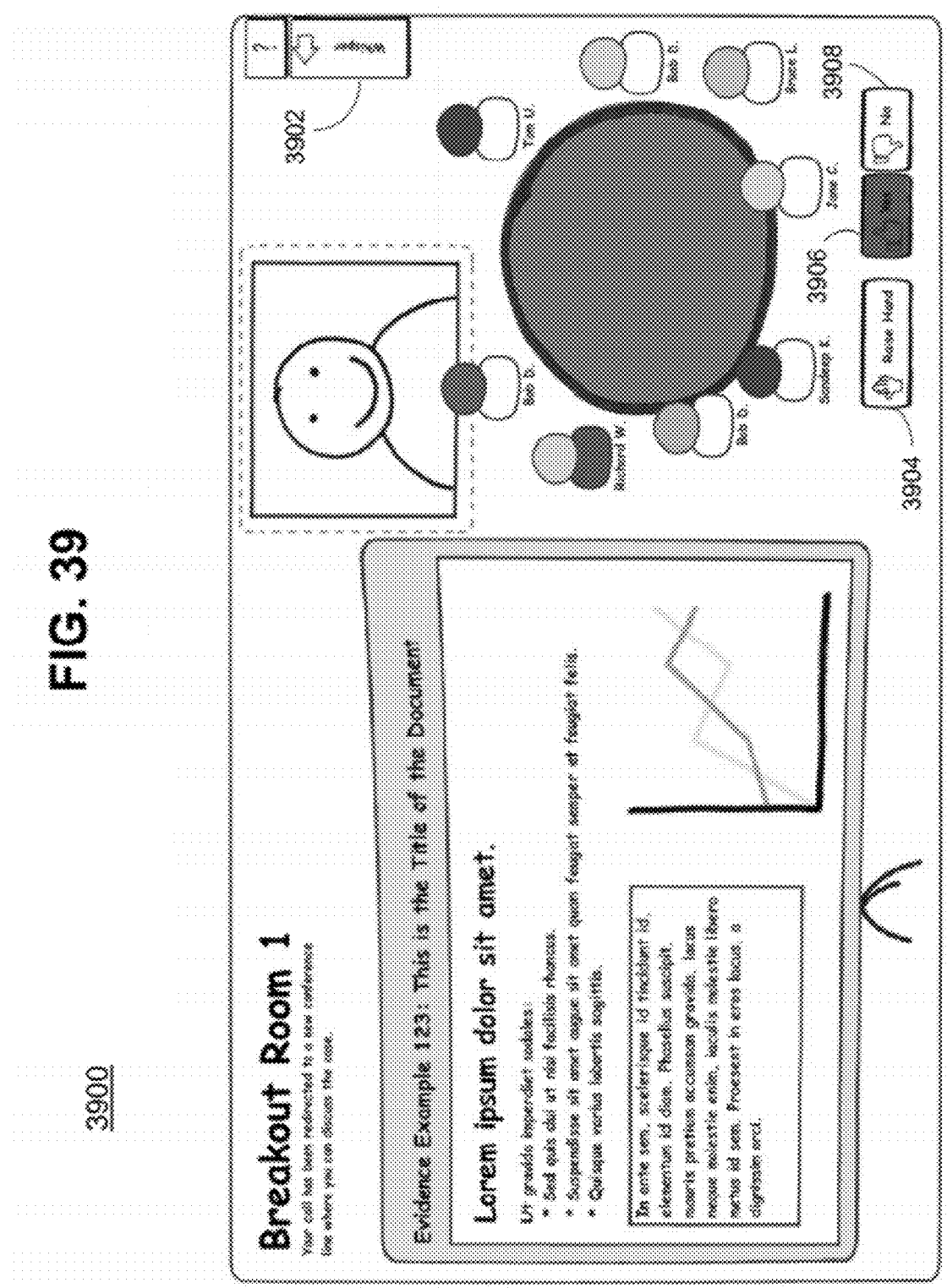

A breakout room display 3900 can be presented as shown in FIG. 39 to jurors upon a breakout session being triggered by a trial manager in some embodiments. As shown, a juror may have options to chat or whisper by actuating icon 3902, raise his/her hand by actuating icon 3904, and/or vote yes by actuating icon 3906 or no by actuating icon 3908.

Figure 40:
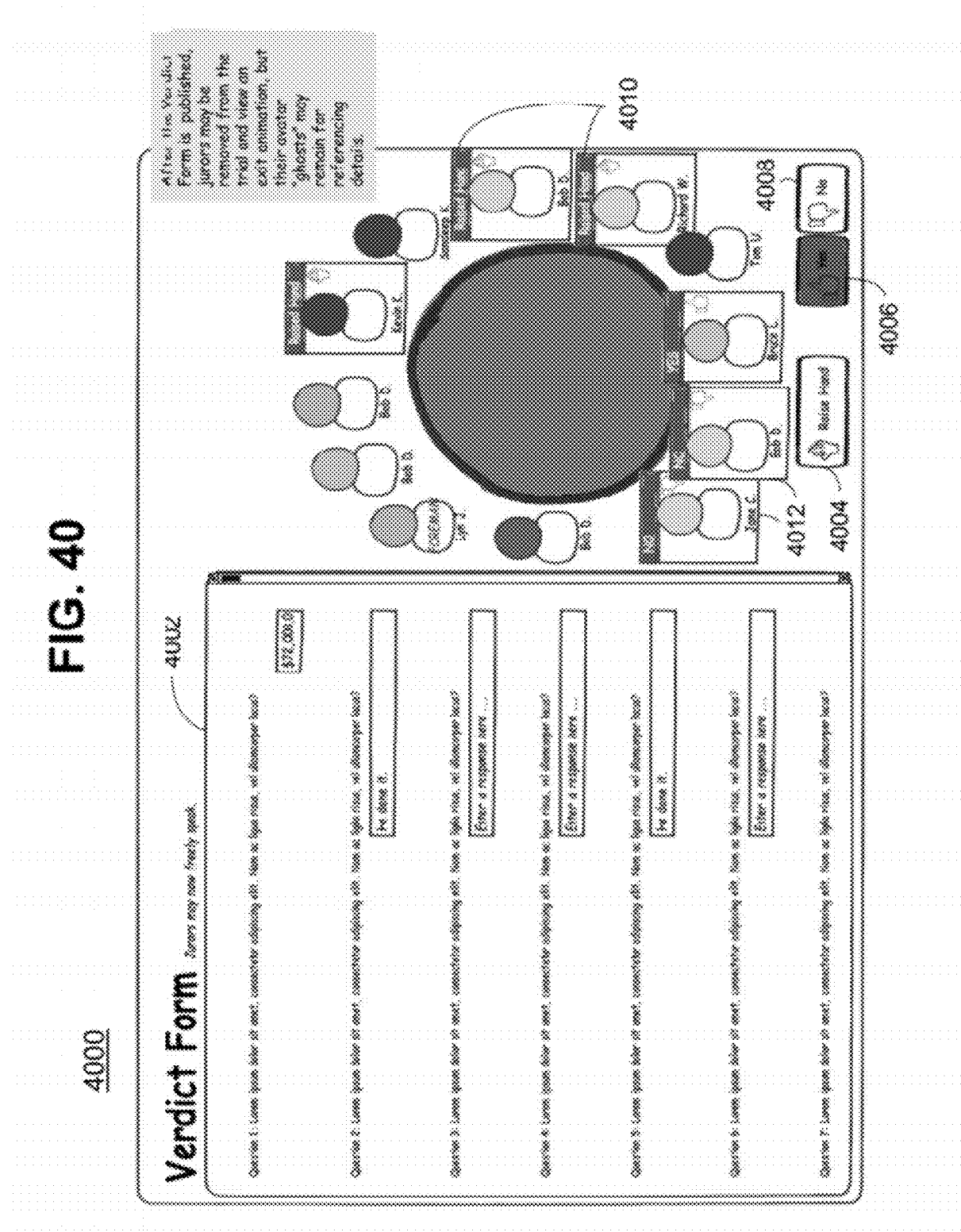

When the mock trial attorney presentations have ended, the trial manager may in some embodiments cause a verdict form 4002 to be presented to the mock jurors as illustrated in a display screen 4000 of FIG. 40. As illustrated, the juror (or a foreperson only) can fill out the verdict form. All jurors can raise his/her hand by actuating icon 4004, can vote yes by actuating icon 4006 or no by actuating icon 4008, can see other raised hands 4010, and can see other votes 4012.

In accordance with some embodiments, the techniques described herein can be implemented at least in part in one or more computer systems. Such computer systems can be servers, user computers, user mobile devices, etc. These computer systems can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. A relational database can also be provided to store user data. This data can include text and tabular reports on the findings of the mock trial. Data can be gathered through polls, questionnaires, and verdict forms. This data can also include recordings of the sessions during the mock trial, materials used during the mock trial, etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Note that the invention is not limited to providing virtual mock trials, but can also be used to provide various types of virtual focus groups. Such focus groups can be used to evaluate or give opinions on, for example, various concepts, ideas, products, services, packaging, advertisements, television commercials, political issues and/or campaigns, current events, social issues, and/or any other suitable topic or matter.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method of providing a presentation to a plurality of remote participants for evaluation of the presentation by at least some of the remote participants, the method comprising:
   receiving at a hardware processor information pertaining to a presentation that comprises a mock trial for evaluation;
   receiving at the hardware processor information pertaining to a plurality of evaluation participants that comprises a mock jury;
   receiving at the hardware processor a request to initiate an interactive presentation session;
   generating a first display of the presentation and a second display of the presentation, the first display of the presentation and the second display of the presentation each comprising an arrangement of content, the content comprising at least one of a live-action video, a pre-recorded video, an image, text, interactive actuators or icons, or a combination thereof and comprising at least one of a representation of the mock jury, an evidentiary demonstrative, or a representation of an attorney, wherein the first display has a first set of interactive options and the second display has a second set of interactive options;
   transmitting via a network the first display of the presentation to a plurality of user devices associated with the plurality of evaluation participants and the second display of the presentation to a user device of at least one other remote participant that comprises a trial manager, an attorney, a witness, or an observer;
   receiving at the hardware processor at least one evaluation of the presentation from at least one of the plurality of evaluation participants while the presentation is being displayed, wherein the at least one evaluation of the presentation comprises a persuasiveness indicator that is a non-binary indication of a level of persuasiveness of an argument of the presentation;
   determining that one of the plurality of evaluation participants is distracted if an adjustment of a non-binary indication of a level of persuasiveness of the argument of the presentation has not been received from the one of the plurality of evaluation participants for a given period of time;
   alerting at least one of the at least one other remote participant that the one of the plurality of evaluation participants is distracted;
   receiving a user input from the at least one of the at least one other remote participant to cause a display of the one of the plurality of evaluation participants that is distracted to shake in response to determining that the one of the plurality of evaluation participants is distracted; and
   receiving an indication that the one of the plurality of evaluation participants is to be removed from the plurality of evaluation participants.

2. The method of claim 1 wherein:
   the second display of the presentation comprises at least some different content, a different arrangement of content, or both than that of the first display of the presentation; and
   the at least one other remote participant comprises a presentation manager, a presenter, or an observer.

3. The method of claim 1 further comprising initiating an interactive session among a portion of the plurality of evaluation participants and the at least one other remote participant in response to receiving an interactive session request at the hardware processor.

4. The method of claim 1 further comprising:
transmitting via a network a participation verification check to a user device associated with an evaluation participant; and
receiving at the hardware processor an acknowledgement of the participation verification check; or
in response to not receiving an acknowledgement, at least one of:
transmitting via a network to the user device associated with the evaluation participant a visual or audible alert, or
terminating transmission of the first display of the presentation to the user device associated with the evaluation participant.

5. The method of claim 1 further comprising:
receiving at the hardware processor a request to view status of the plurality of user devices associated with the plurality of evaluation participants;
generating a second display of the presentation comprising content regarding the status of the plurality of user devices associated with the plurality of evaluation participants; and
transmitting via a network the second display to the user device of the at least one other remote participant.

6. The method of claim 1 wherein the receiving at the hardware processor of at least one evaluation of the presentation comprises at least one of:
receiving at the hardware processor at least one evaluation of the presentation after conclusion of the presentation; or
initiating an interactive session in response to receiving an interactive session request at the hardware processor, and receiving at the hardware processor at least one evaluation of the presentation during the interactive session.

7. A system for providing a presentation to a plurality of remote participants for evaluation of the presentation by at least some of the remote participants, the system comprising one or more hardware processors operative to:
receive information pertaining to a presentation that comprises a mock trial for evaluation;
receive information pertaining to a plurality of evaluation participants that comprises a mock jury;
receive a request to initiate an interactive presentation session;
generate a first display of the presentation and a second display of the presentation, the first display of the presentation and the second display of the presentation each comprising an arrangement of content, the content comprising at least one of a live-action video, a pre-recorded video, an image, text, interactive actuators or icons, or a combination thereof and comprising at least one of a representation of the mock jury, an evidentiary demonstrative, or a representation of an attorney, wherein the first display has a first set of interactive options and the second display has a second set of interactive options;
transmit via a network the first display of the presentation to a plurality of user devices associated with the plurality of evaluation participants and the second display of the presentation to a user device of at least one other remote participant that comprises a trial manager, an attorney, a witness, or an observer;
receive at least one evaluation of the presentation from at least one of the plurality of evaluation participants while the presentation is being displayed, wherein the at least one evaluation of the presentation comprises a persuasiveness indicator that is a non-binary indication of a level of persuasiveness of an argument of the presentation;
alert at least one of the at least one other remote participant that the one of the plurality of evaluation participants is distracted;
receive a user input from the at least one of the at least one other remote participant to cause a display of the one of the plurality of evaluation participants that is distracted to shake in response to determining that the one of the plurality of evaluation participants is distracted; and
receive an indication that the one of the plurality of evaluation participants is to be removed from the plurality of evaluation participants.

8. The system of claim 7 wherein:
the second display of the presentation comprises at least some different content, a different arrangement of content, or both than that of the first display of the presentation; and
the at least one other remote participant comprises a presentation manager, a presenter, or an observer.

9. The system of claim 7 wherein the one or more hardware processors are further operative to initiate an interactive session among a portion of the plurality of evaluation participants and the at least one other remote participant in response to receiving an interactive session request.

10. The system of claim 7 wherein the one or more hardware processors are further operative to:
transmit via a network a participation verification check to a user device associated with an evaluation participant; and
receive an acknowledgement of the participation verification check; or in response to not receiving an acknowledgement, at least one of:
transmit via a network to the user device associated with the evaluation participant a visual or audible alert, or
terminate transmission of the first display of the presentation to the user device associated with the evaluation participant.

11. The system of claim 7 wherein the one or more hardware processors are further operative to:
receive a request to view status of the plurality of user devices associated with the plurality of evaluation participants;
generate a second display of the presentation comprising content regarding the status of the plurality of user devices associated with the plurality of evaluation participants; and
transmit via a network the second display to the user device of the at least one other remote participant.

12. The system of claim 7 wherein the one or more hardware processors operative to receive at least one evaluation of the presentation are operative to:
receive at least one evaluation of the presentation after conclusion of the presentation; or
initiate an interactive session in response to receiving an interactive session request, and receive at least one evaluation of the presentation during the interactive session.

13. A non-transitory computer-readable medium containing computer-executable instructions that, when executed by a processor, cause the processor to perform a method of providing a presentation to a plurality of remote participants for evaluation of the presentation by at least some of the remote participants, the method comprising:

receiving information pertaining to a presentation that comprises a mock trial for evaluation;

receiving information pertaining to a plurality of evaluation participants that comprises a mock jury;

receiving a request to initiate an interactive presentation session;

generating a first display of the presentation and a second display of the presentation, the first display of the presentation and the second display of the presentation each comprising an arrangement of content, the content comprising at least one of a live-action video, a pre-recorded video, an image, text, interactive actuators or icons, or a combination thereof and comprising at least one of a representation of the mock jury, an evidentiary demonstrative, or a representation of an attorney, wherein the first display has a first set of interactive options and the second display has a second set of interactive options;

transmitting via a network the first display of the presentation to a plurality of user devices associated with the plurality of evaluation participants and the second display of the presentation to a user device of at least one other remote participant that comprises a trial manager, an attorney, a witness, or an observer;

receiving at least one evaluation of the presentation from at least one of the plurality of evaluation participants while the presentation is being displayed, wherein the at least one evaluation of the presentation comprises a persuasiveness indicator that is a non-binary indication of a level of persuasiveness of an argument of the presentation;

determining that one of the plurality of evaluation participants is distracted if an adjustment of a non-binary indication of a level of persuasiveness of the argument of the presentation has not been received from the one of the plurality of evaluation participants for a given period of time;

alerting at least one of the at least one other remote participant that the one of the plurality of evaluation participants is distracted;

receiving a user input from the at least one of the at least one other remote participant to cause a display of the one of the plurality of evaluation participants that is distracted to shake in response to determining that the one of the plurality of evaluation participants is distracted; and receiving an indication that the one of the plurality of evaluation participants is to be removed from the plurality of evaluation participants.

14. The non-transitory computer-readable medium of claim 13 wherein the method further comprises initiating an interactive session among a portion of the plurality of evaluation participants and the at least one other remote participant in response to receiving an interactive session request at the hardware processor.

15. The non-transitory computer-readable medium of claim 13 wherein the method further comprises:

transmitting via a network a participation verification check to a user device associated with an evaluation participant; and receiving an acknowledgement of the participation verification check; or in response to not receiving an acknowledgement, at least one of:

transmitting via a network to the user device associated with the evaluation participant a visual or audible alert, or terminating transmission of the first display of the presentation to the user device associated with the evaluation participant.

16. The non-transitory computer-readable medium of claim 13 wherein the method further comprises:

receiving a request to view status of the plurality of user devices associated with the plurality of evaluation participants;

generating a second display of the presentation comprising content regarding the status of the plurality of user devices associated with the plurality of evaluation participants; and transmitting via a network the second display to the user device of the at least one other remote participant.

17. The non-transitory computer-readable medium of claim 13 wherein the method step of receiving at least one evaluation of the presentation comprises at least one of:

receiving at least one evaluation of the presentation after conclusion of the presentation; or initiating an interactive session in response to receiving an interactive session request, and receiving at least one evaluation of the presentation during the interactive session.

* * * * *